US008617502B2

(12) United States Patent
Augustine et al.

(10) Patent No.: US 8,617,502 B2
(45) Date of Patent: Dec. 31, 2013

(54) CE CONTAINING, V-FREE MOBILE DENOX CATALYST

(75) Inventors: Steven Mark Augustine, Ellicott City, MD (US); David Monroe Chapman, Ellicott City, MD (US); Mark Barrett Watson, Kensington, MD (US)

(73) Assignee: Cristal USA Inc., Hunt Valley, MD (US)

( * ) Notice: Subject to any disclaimer, the term of this patent is extended or adjusted under 35 U.S.C. 154(b) by 173 days.

(21) Appl. No.: 13/022,325

(22) Filed: Feb. 7, 2011

(65) Prior Publication Data
US 2012/0201732 A1    Aug. 9, 2012

(51) Int. Cl.
*B01D 53/56* (2006.01)
*B01D 53/86* (2006.01)
*B01J 8/00* (2006.01)
*B01J 23/00* (2006.01)
*B01J 21/00* (2006.01)
*C01B 21/00* (2006.01)

(52) U.S. Cl.
USPC ........ 423/239.1; 502/208; 502/304; 502/349; 502/350; 502/351; 502/439; 977/811

(58) Field of Classification Search
USPC ............... 502/208, 304, 349, 350, 351, 439; 423/239.1; 977/811
See application file for complete search history.

(56) References Cited

U.S. PATENT DOCUMENTS

| | | | |
|---|---|---|---|
| 3,279,884 A | 10/1966 | Nonnenmacher et al. | |
| 4,048,112 A | 9/1977 | Matsushita et al. | |
| 4,085,193 A | 4/1978 | Nakajima et al. | |
| 4,221,768 A | 9/1980 | Inoue et al. | |
| 4,663,305 A * | 5/1987 | Mauldin et al. | 502/304 |
| 4,833,113 A | 5/1989 | Imanari et al. | |
| 5,344,588 A | 9/1994 | Chane-Ching | |
| 6,255,249 B1 | 7/2001 | Voss et al. | |
| 7,247,283 B2 | 7/2007 | Hedouin | |
| 7,491,676 B2 * | 2/2009 | Augustine et al. | 502/353 |
| 7,640,936 B2 * | 1/2010 | Rabiei et al. | 131/365 |
| 7,655,137 B2 * | 2/2010 | Zhou et al. | 208/134 |
| 7,743,772 B2 * | 6/2010 | Sundar et al. | 131/334 |
| 7,820,583 B2 * | 10/2010 | Fu et al. | 502/209 |
| 7,879,759 B2 * | 2/2011 | Augustine et al. | 502/350 |

(Continued)

FOREIGN PATENT DOCUMENTS

| | | |
|---|---|---|
| EP | 299 294 | 1/1989 |
| EP | 0 547 226 | 6/1993 |

(Continued)

OTHER PUBLICATIONS

International Search Report and Written Opinion of the International Searching Authority issued Jun. 27, 2012, in PCT/US12/22502.

*Primary Examiner* — Cam N. Nguyen
(74) *Attorney, Agent, or Firm* — Oblon, Spivak, McClelland, Maier & Neustadt, L.L.P.

(57) ABSTRACT

A catalyst for removal of NOx from exhaust gas, containing cerium oxide and titanium dioxide, wherein a first portion of the cerium oxide forms at least one agglomerate of cerium oxide crystallites interdispersed in the titanium dioxide, and a second portion of the cerium oxide forms at least one island on a surface of the titanium dioxide, a method for producing the catalyst, a process for selectively reducing NOx levels in an exhaust gas using the catalyst, and an SCR canister containing the catalyst therein.

39 Claims, 19 Drawing Sheets

(56) References Cited

U.S. PATENT DOCUMENTS

| | | | |
|---|---|---|---|
| 7,968,492 B2* | 6/2011 | Augustine | 502/350 |
| 8,011,374 B2* | 9/2011 | Rabiei et al. | 131/356 |
| 8,148,295 B2* | 4/2012 | Augustine | 502/350 |
| 8,247,343 B2* | 8/2012 | Chapman | 502/164 |
| 2002/0045545 A1 | 4/2002 | Oki et al. | |
| 2004/0219077 A1 | 11/2004 | Voss et al. | |
| 2005/0130836 A1 | 6/2005 | Kato et al. | |
| 2006/0029535 A1 | 2/2006 | Ott | |
| 2006/0084569 A1 | 4/2006 | Augustine et al. | |
| 2008/0132452 A1 | 6/2008 | Saus et al. | |
| 2008/0279740 A1* | 11/2008 | Augustine et al. | 423/239.1 |
| 2010/0034717 A1 | 2/2010 | Adelmann et al. | |
| 2010/0076208 A1 | 3/2010 | Dhingra et al. | |
| 2010/0111789 A1 | 5/2010 | Fajardie et al. | |
| 2010/0209324 A1 | 8/2010 | Augustine | |
| 2010/0247411 A1 | 9/2010 | Larcher et al. | |
| 2011/0027154 A1 | 2/2011 | Chapman | |

FOREIGN PATENT DOCUMENTS

| | | |
|---|---|---|
| EP | 738 179 | 10/1996 |
| JP | 2003/093880 | 4/2003 |
| WO | WO 2004/022229 | 3/2004 |
| WO | WO 2008/046920 | 4/2008 |
| WO | WO 2008/051752 | 5/2008 |
| WO | WO 2008/132452 | 11/2008 |
| WO | WO 2009/001131 | 12/2008 |
| WO | WO 2009/099937 | 8/2009 |

* cited by examiner

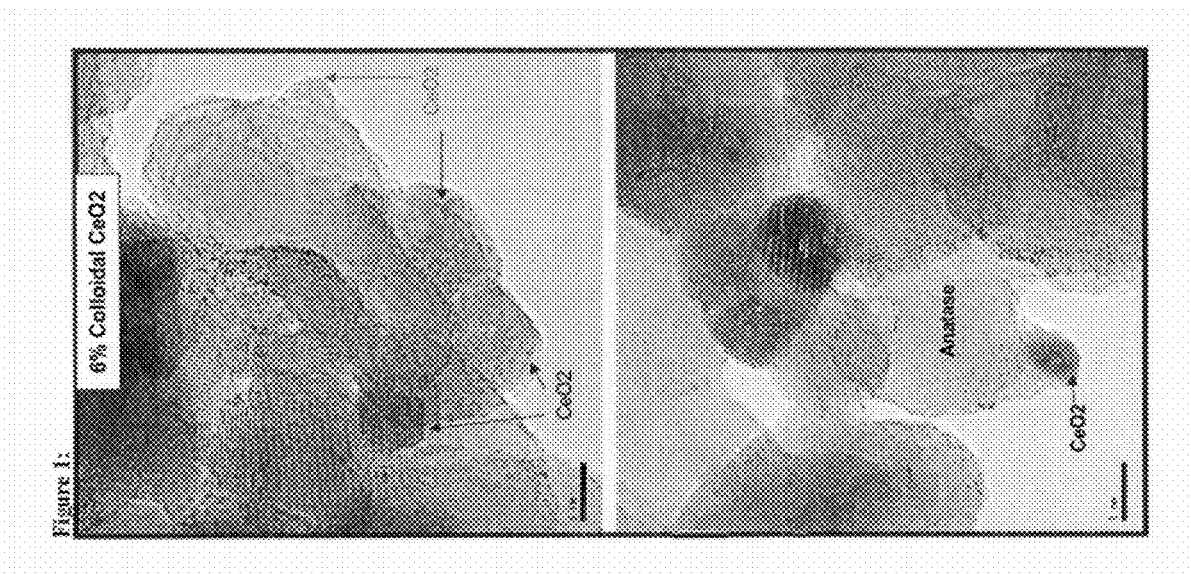

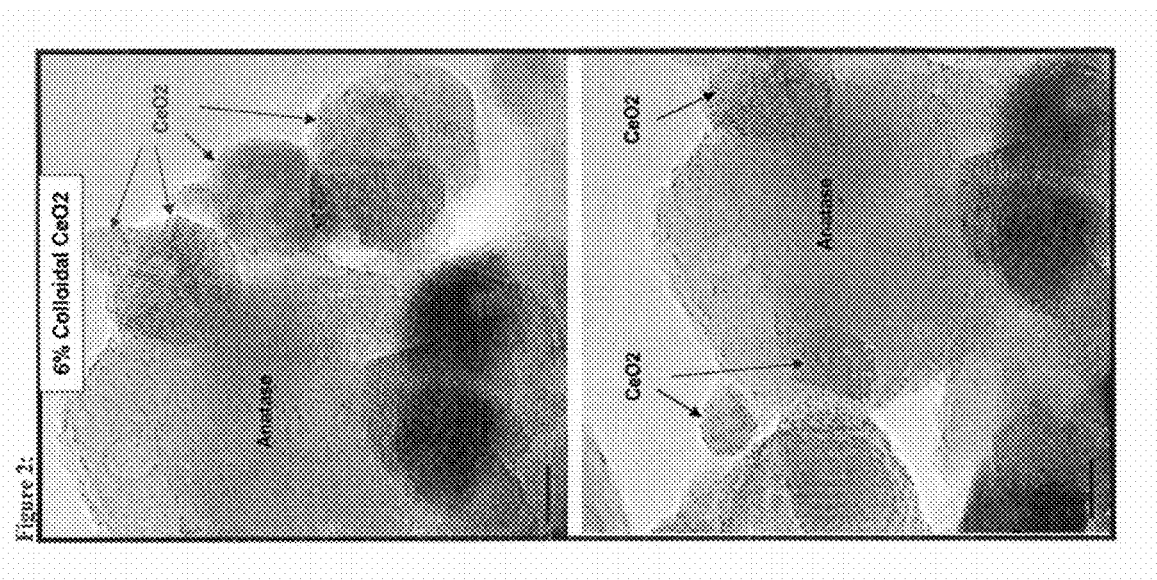

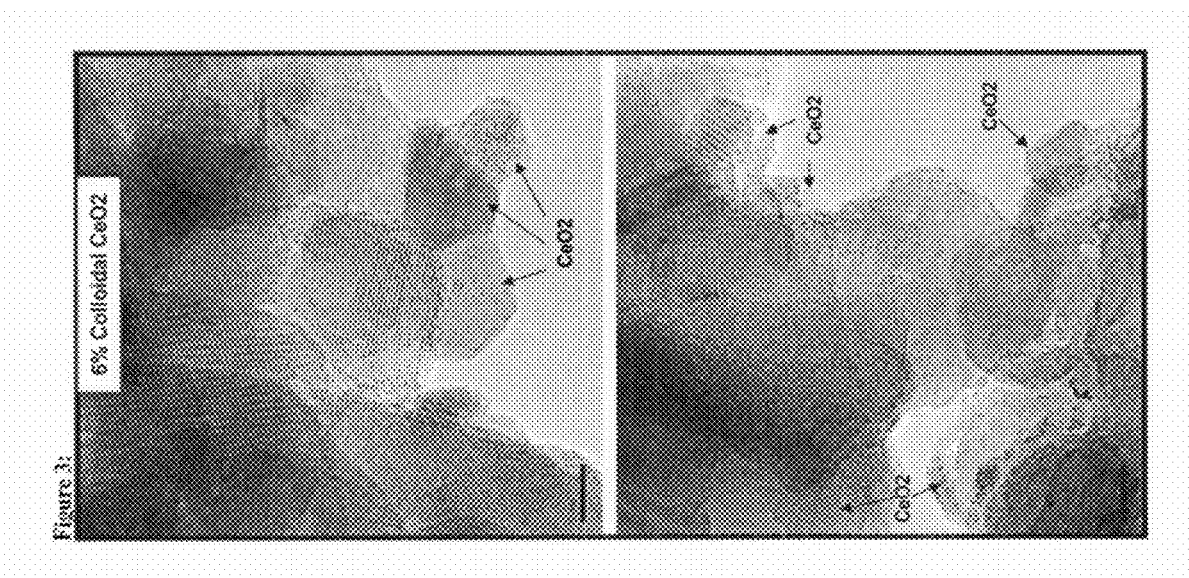

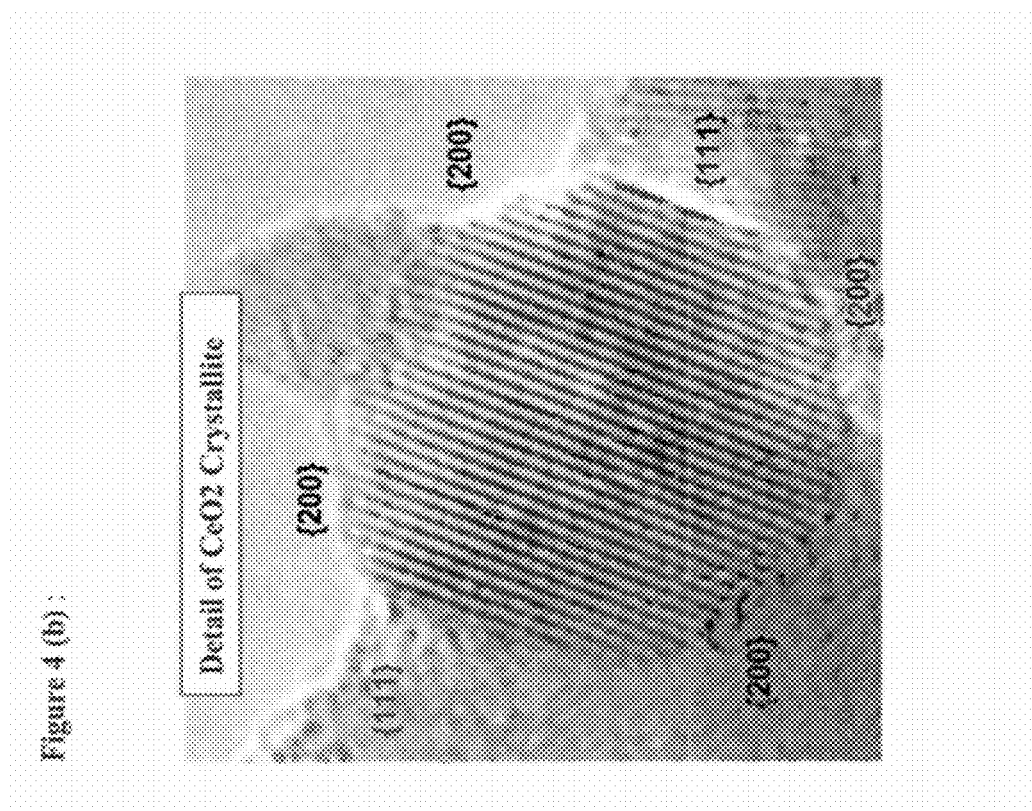

CE CONTAINING, V-FREE MOBILE DENOX CATALYST

FIELD OF THE INVENTION

The present invention relates to a catalyst effective for selective reduction of nitrogen oxides (NOx) with ammonia or ammonia precursors, a method of making said catalyst by combining cerium oxide ($CeO_2$) and titanium dioxide ($TiO_2$), optionally of the anatase form, with a specific morphology, and a method of using said catalyst for NOx removal from the emissions of mobile sources such as light or heavy duty trucks.

DESCRIPTION OF THE RELATED ART

The high temperature combustion of fossil fuels in the presence of air leads to the unwanted formation of pollution forming NOx. New regulations in Europe, the U.S., Japan, and the developing world are requiring continued reductions in NOx levels from emission sources. Selective catalytic reduction (SCR) has been used as an alternative for NOx removal from the emissions of vehicles employing lean burn technologies such as diesel engines. A widely used catalyst system, on the basis of performance to cost ratio, involves vanadium pentoxide supported on the combination of tungsten oxide and titanium oxide. While this has proven effective in applications involving stationary sources (e.g. power plants, boilers, etc.) there is a concern about using the same catalyst in automotive sources due to vanadium oxide's toxicity and perceived volatility at very high temperatures.

In order to address this concern, research has been done to find alternatives to vanadia on titania, such as transition metals ion exchanged into zeolites (US 20060029535A1, EP 738179B1, EP 299294A2, WO 2004022229A1). In addition, recent improvements have been made by supporting Cu on silica, alumina, phosphate zeolites of the CHA structure type such as catalysts disclosed by US2008/132452, or US 2009/099937. Even though these materials prove somewhat effective in the SCR process, the zeolite based systems have proven to be very costly, sometimes a factor of five greater than titania supported catalysts.

Less expensive alternatives have been proposed such as catalysts supported on base metal oxides such as cerium-zirconium mixed oxides (US 20100034717 A1 and WO 2009001131 A1), or titanium-zirconium mixed oxides (WO 2008046920 A1, U.S. Pat. No. 7,247,283, US 20100247411 A1). However, not only are these materials fairly complex, they have not demonstrated a performance superior to commercial iron on beta zeolite.

Catalysts comprising a composite oxide of two or more metals selected from the group consisting of Si, Ti and Zr and an oxide of one or more metals selected from the group consisting of V, Mo, Sn, Ce and W are disclosed in EP 0 547 226. In addition, catalysts comprising at least one catalytic oxide selected from a binary oxide comprising titanium and silicon and a ternary oxide comprising Ti, Zr and Si, combined with a first catalytic oxide comprising V, W, Mo, U, Cu, Fe, Mn, or Ce and an and a second catalytic oxide comprising Sn, Zn, Ti, Zr, Ni, Co, Nb, Ta, P, Br, Bi, Sb, alkali metals and alkaline earth metals are disclosed in U.S. Pat. No. 4,221,768. Furthermore catalysts comprising cerium oxide embedded in titanium oxide is disclosed in U.S. Pat. No. 7,585,807. The limitation of this prior art is that little attention is paid to how one would optimize catalyst performance by modifying the active phase morphology. For example, in U.S. Pat. No. 7,585,807 Kato et al. teach the addition of a colloidal cerium dioxide along with tungstic acid to a hydrous titanium oxide followed by washcoating on aluminosilicate fibers, drying, and calcination. The inventors describe the morphology as "particles of Ce oxide (which is an active component) in the gaps (or spaces) between the $TiO_2$ crystals" [U.S. Pat. No. 7,585,807, Lines 30-31, Column 3]. These particles may further be described as colloidal cerium oxide agglomerates interdispersed among anatase titanium oxide crystallites as represented in FIGS. 1-4. Conversely, in U.S. Pat. No. 4,221,768 Inoue et al. disclose depositing a soluble cerium nitrate salt on to a 80:20 titania:silica support followed by kneading, extruding, drying and calcination. Those skilled in the art would understand that this method produces two-dimensional islands of cerium oxide on the surface of titanium oxide & silica support, and a comparable morphology is shown in FIGS. 5-8. Mitsui et al. do not teach a specific means by which to add Ce to the catalyst in EP 0 547 226.

Given that each of these different methods produce catalysts of varying activities, one of ordinary skill would not expect that combining more than one morphology of cerium oxide, that of colloidal cerium oxide interdispersed among anatase titania particles along with cerium oxide islands on top of the titania surface as that as formed by depositing a soluble cerium salt followed by calcination, would produce the surprising result of a significant increase in the catalyst activity for NOx removal. Furthermore, it is not anticipated that these two morphologies may be present simultaneously, with both specifically being formed by the means with which the cerium is added. Additionally, it is unexpected that the order by which these two morphological species are combined with the support is important as a means to maximize NOx conversion.

SUMMARY OF THE INVENTION

An object of the present invention is to develop a non-toxic alternative to the vanadium pentoxide deposited on tungsten oxide/titania catalysts, which is less expensive than current zeolite based alternatives used for $NO_x$ reduction.

A further object of the present invention is to provide a catalyst having improved capability for removal of NOx by SCR from emissions of mobile sources.

Another object of the present invention is to provide a method for preparing such a catalyst.

A still further object of the present invention is to provide a shaped SCR piece containing the catalyst.

These and other objects of the present invention, either individually or in combinations thereof, have been satisfied by the discovery of a catalyst for removal of NOx from exhaust gas, comprising cerium oxide and titanium dioxide, optionally anatase titanium dioxide, wherein a first portion of the cerium oxide forms at least one agglomerate of cerium oxide containing crystallites interdispersed in the titanium dioxide, and a second portion of the cerium oxide forms at least one cerium oxide containing island on a surface of the titanium dioxide; along with a method for producing the catalyst, a process for selectively reducing NOx levels in an exhaust gas using the catalyst, and an SCR canister containing the catalyst therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a Transmission Electron Microscopy (TEM) image of DT-51 treated with 6 weight % colloidal $CeO_2$ (relative to total solids).

FIG. 2 is a TEM image of DT-51 treated with 6 weight % colloidal $CeO_2$.

FIG. 3 is a TEM image of DT-51 treated with 6 weight % colloidal $CeO_2$.

DETAILED DESCRIPTION OF THE PREFERRED EMBODIMENTS

Figure 4A:
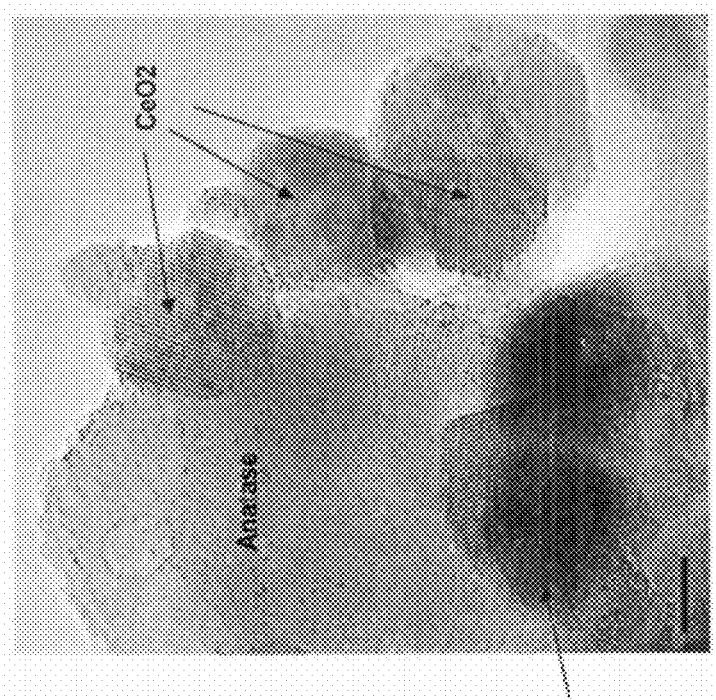
FIG. 4(a) is a TEM image of DT-51 treated with 6 weight % colloidal $CeO_2$.
Figure 4:
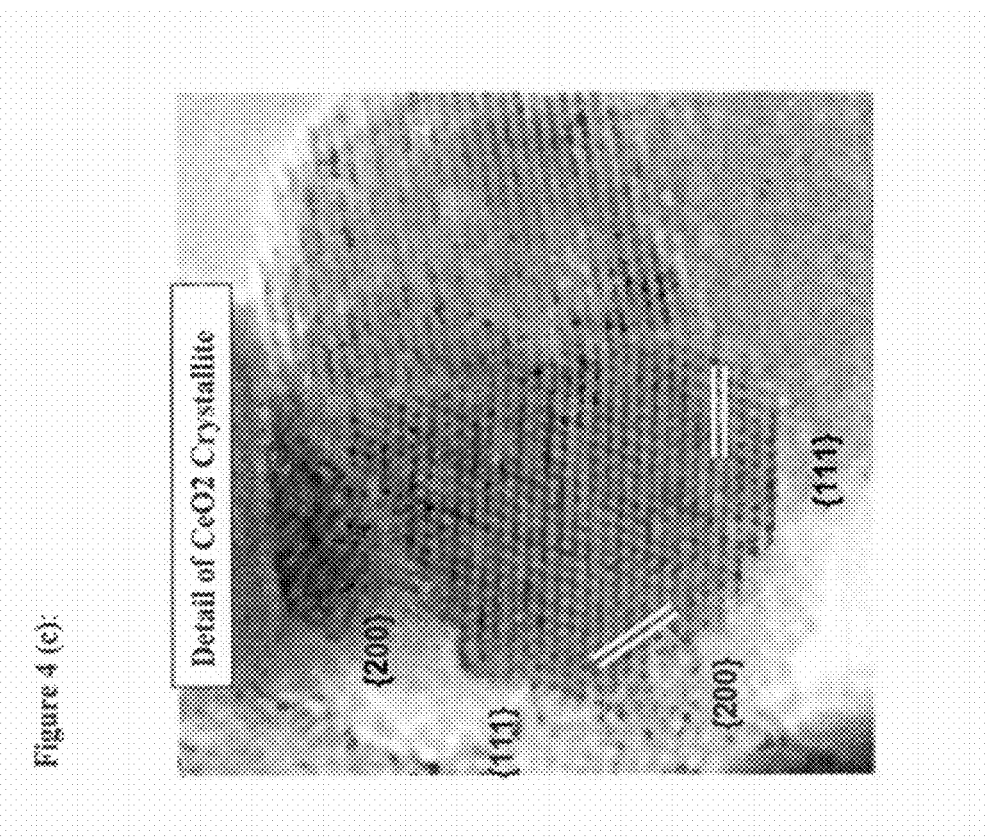
FIG. 4(b) is a TEM image of DT-51 treated with 6 weight % colloidal $CeO_2$.
FIG. 4(c) is a TEM image of DT-51 treated with 6 weight % colloidal $CeO_2$.
Figure 5:
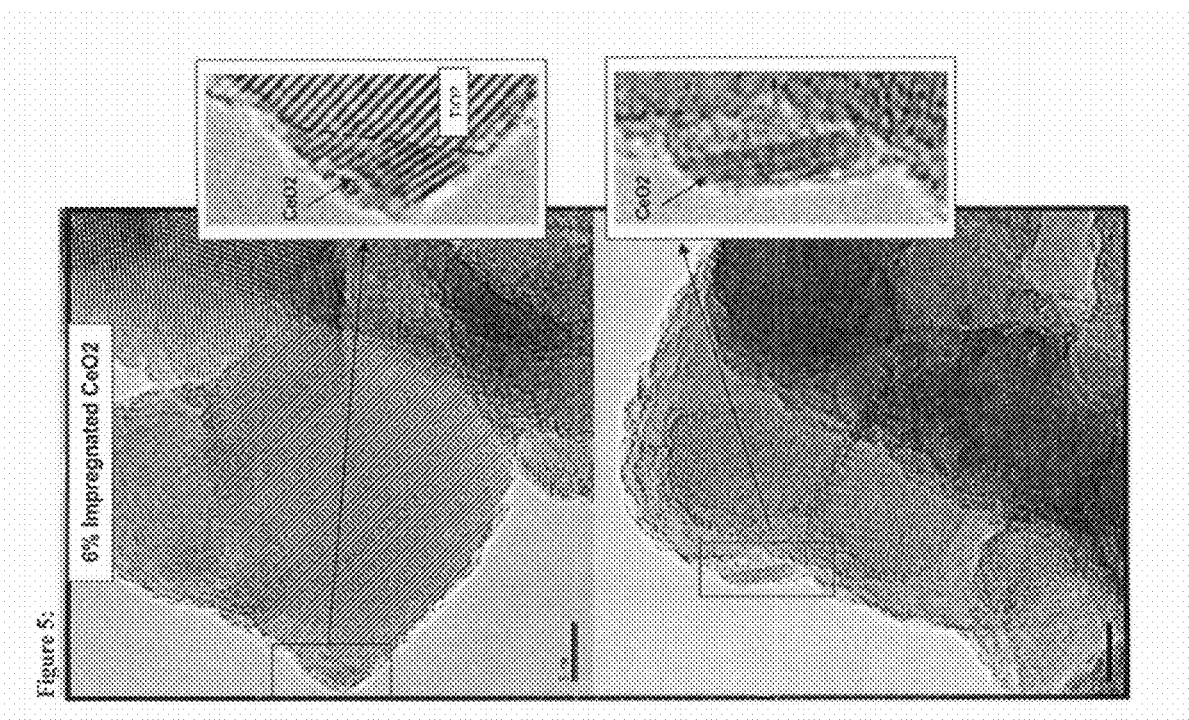
FIG. 5 is a TEM image of DT-51 impregnated with 6 weight % $CeO_2$.
Figure 6:
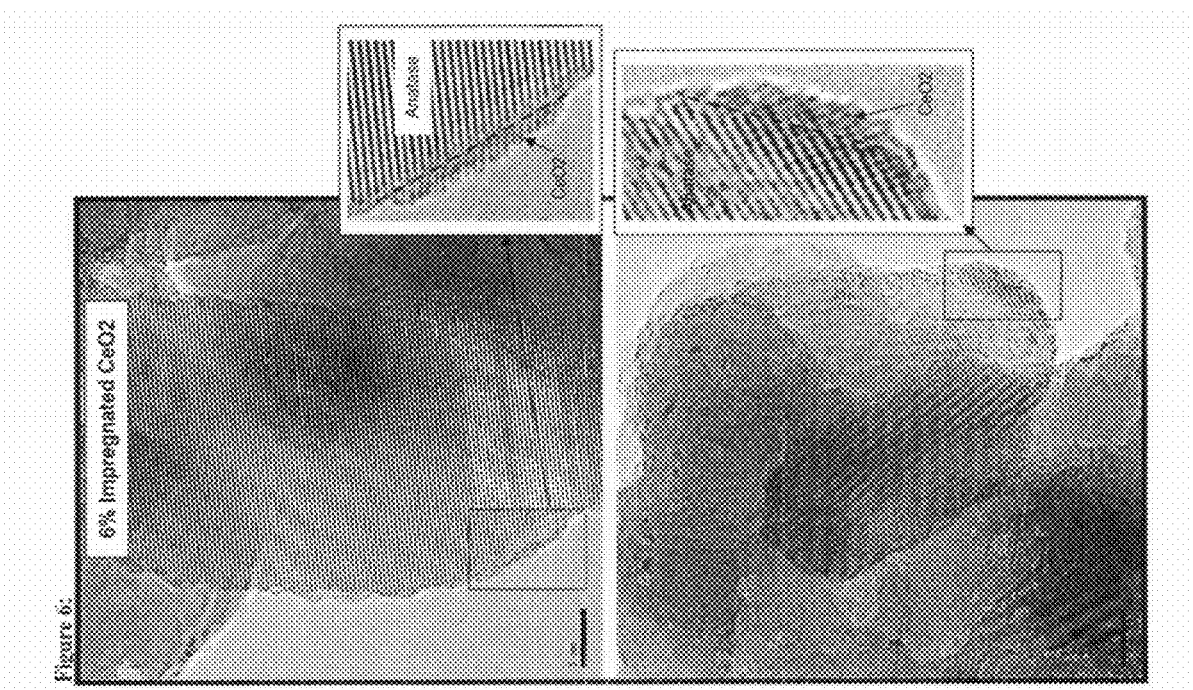
FIG. 6 is a TEM image of DT-51 impregnated with 6 weight % $CeO_2$.
Figure 7:
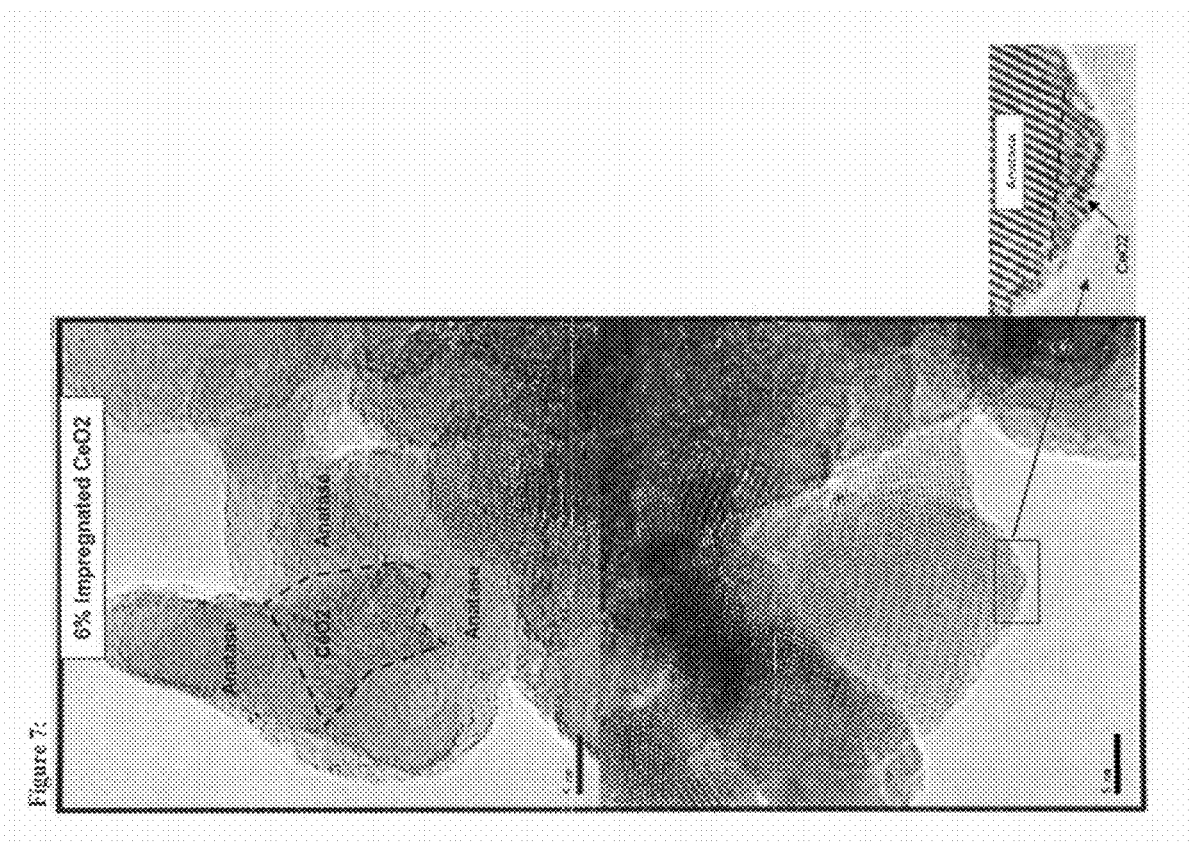
FIG. 7 is a TEM image of DT-51 impregnated with 6 weight % $CeO_2$.
Figure 8A:
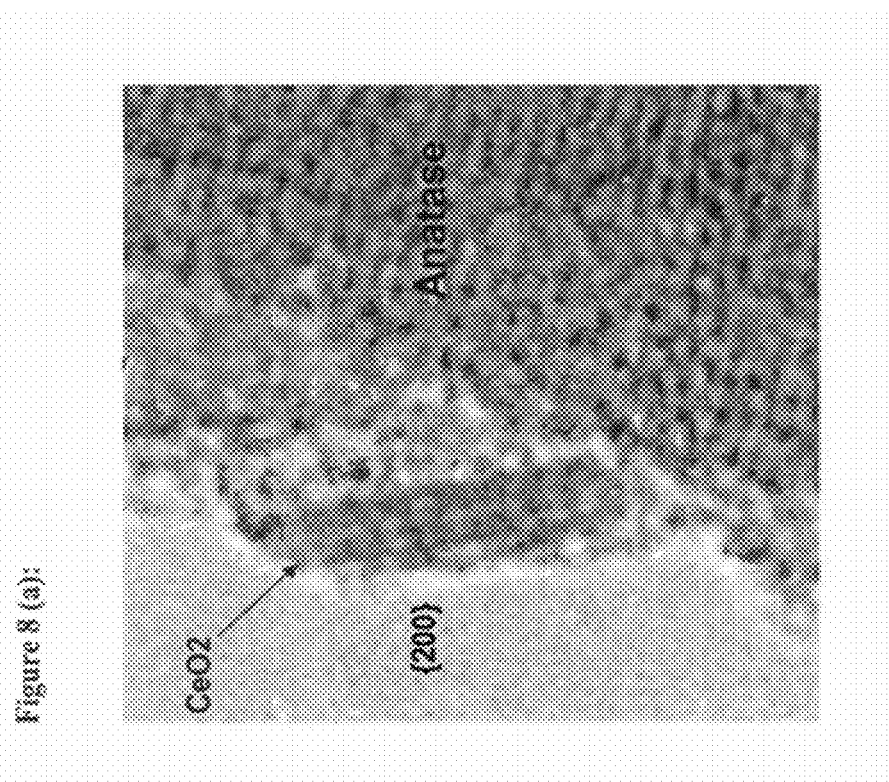
FIG. 8(a) is a TEM image of DT-51 impregnated with 6 weight % $CeO_2$.
Figure 8:
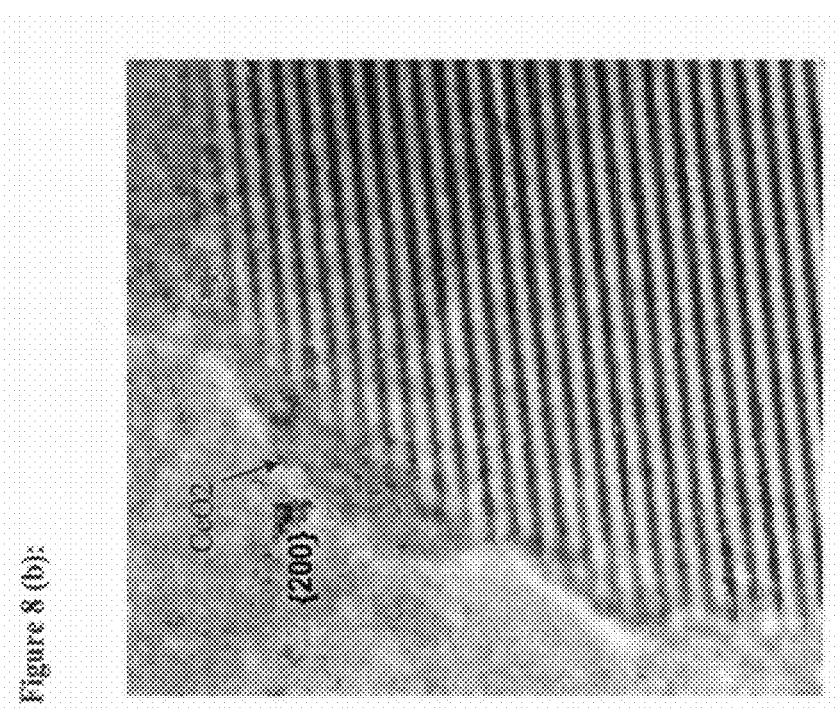
FIG. 8(b) is a TEM image of DT-51 impregnated with 6 weight % $CeO_2$.
FIG. 8(c) is a TEM image of DT-51 impregnated with 6 weight % $CeO_2$.
FIG. 8(d) is a TEM image of DT-51 impregnated with 6 weight % $CeO_2$.
Figure 8:
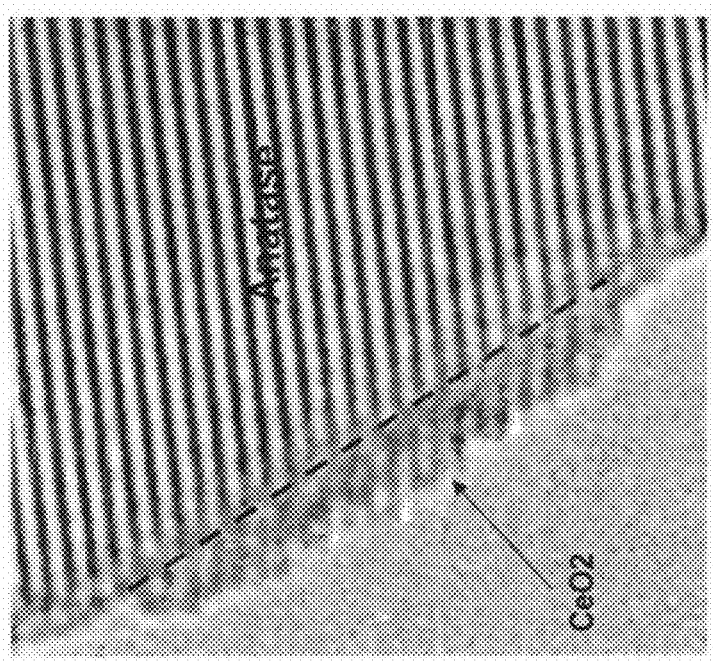
Figure 8:
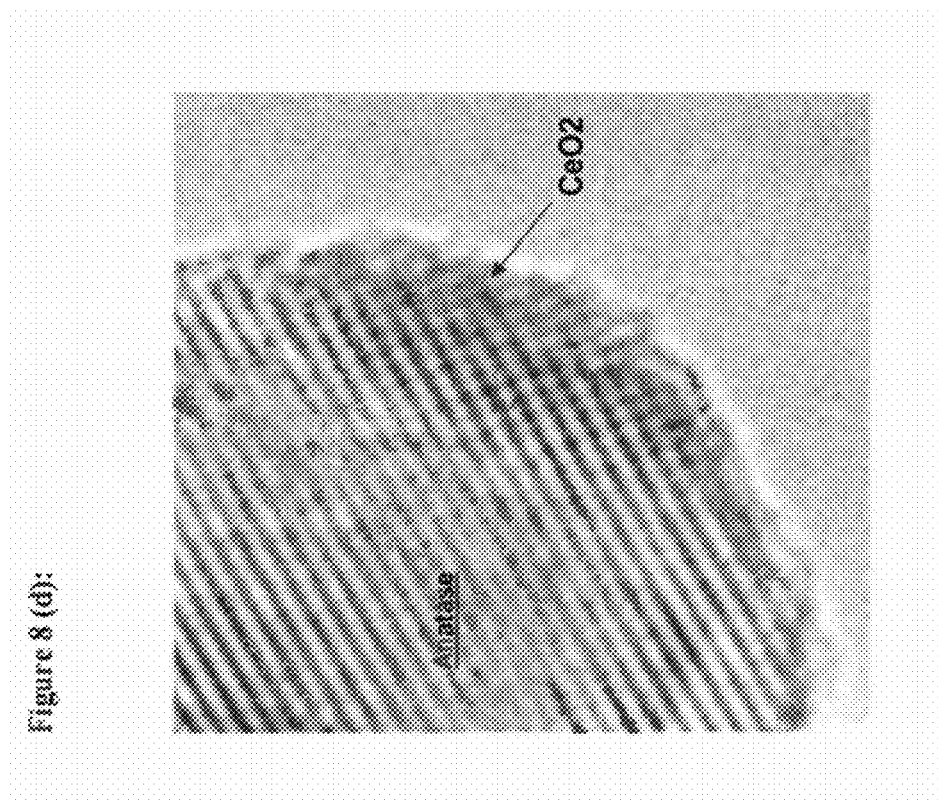

The present invention relates to a catalyst for removing nitrogen oxides, which has a high activity and thermal stability, and is efficient for the removal of NOx from exhaust gas even at high temperatures and after aging. The present invention catalyst provides a low cost alternative to commercial iron on beta zeolite with comparable if not superior performance, and further provides a superior, non-toxic alternative to vanadium oxide on tungsten oxide/titania catalysts. The present invention catalyst may be employed in many possible uses, particularly for NOx removal from the emissions of mobile sources such as light or heavy duty trucks.

In particular, the present invention relates to a catalyst comprising cerium oxide ($CeO_2$) and anatase titanium dioxide ($TiO_2$) in a specific morphology that shows improved catalytic activity over commercial iron on beta-zeolite and vanadia on tungsten-silica-titania catalysts. The morphology involves two forms of cerium oxide. A first portion interacts strongly and directly with the anatase titanium dioxide by forming small islands directly on a surface of the anatase titanium oxide. A second portion interacts less strongly and indirectly by forming a network of agglomerated, porous cerium oxide nanometer-scale crystallites in discrete domains inter-dispersed among the anatase titanium dioxide particles. The two forms of cerium oxide may be contained in a mixture or separately on the surface of the titanium dioxide.

The catalytic activity of the present invention, wherein DT-51 (anatase titanium dioxide produced by Millennium Inorganic Chemicals) is first combined with colloidal $CeO_2$ and then impregnated with Ce salts, provides improved results which are unexpected in view of the prior art.

Primarily, when the catalyst of the present invention was compared to that of Ce salts impregnated on DT-51 alone, the results illustrated that first combining DT-51 with colloidal $CeO_2$ and then impregnating the DT-51 with Ce salts produces an unexpected 26% rate improvement for NOx removal over Ce salts impregnated on DT-51 alone.

In addition, when the catalyst of the present invention was compared to that of colloidal $CeO_2$ combined with DT-51 alone, the results illustrated that simply combining colloidal $CeO_2$ with DT-51 is the least effective means to produce an active catalyst for NOx removal. In addition, the results illustrated that first combining DT-51 with colloidal $CeO_2$ and then impregnating the DT-51 with Ce salts produces an unexpected rate improvement for NOx removal of >100% compared to colloidal $CeO_2$ combined with DT-51 alone.

The morphology of the present catalyst may be controlled by the method of formation. Specifically, the distribution of cerium oxide in these two states is controlled by the way in which the cerium oxide was combined with the anatase titanium dioxide by using a combination of precipitation deposition of soluble cerium salts with variable amounts of colloidal cerium oxide suspensions.

Specifically, the order of addition of the colloidal $CeO_2$ and Ce in salt form contributed to the improvement of catalytic activity. When the present invention catalyst, wherein DT-51 is first combined with colloidal $CeO_2$ and then impregnated with Ce salts, is compared to a composition wherein DT-51 is first impregnated with Ce salts and then combined with colloidal $CeO_2$, the results clearly show that the increased catalytic activity is observed only when the colloidal $CeO_2$ is added to the DT-51 prior to depositing the soluble Ce source. When the orders are reversed, there is little apparent improvement in activity.

Measurement of the catalytic activity of the catalyst after aging, when used in combination with a promoter and following hydrothermal treatment, showed that the presence of the promoter resulted in a further catalytic activity increase after aging. Hydrothermal treatment is a procedure used to simulate catalyst aging after 200,000 km of driving. The results illustrated that first combining promoted DT-51 with colloidal $CeO_2$ and then impregnating the DT-51 with Ce salts produces an unexpected rate improvement of >120% over DT-51 impregnated with Ce alone, and >285% over DT-51 combined with colloidal $CeO_2$ alone. In addition, a catalyst according to an embodiment of the present invention, and preferably obtained by a process comprising first combining promoted DT-51 with colloidal $CeO_2$ and then impregnating the DT-51 with Ce salts, after being subjected to hydrothermal aging, produces an unexpected rate improvement of >310% over hydrothermally treated DT-51 impregnated with Ce alone, and >350% over hydrothermally treated DT-51 combined with colloidal $CeO_2$ alone.

While not intending to be bound by any particular theory of action regarding the present invention catalyst, it is believed that the improvements noted above and illustrated in the Examples are related to the morphology of the resulting present invention catalysts. The presence of both forms of $CeO_2$ produce structures of porous nanometer-scale crystallites in discrete domains inter-dispersed among the anatase titanium dioxide particles as well as small islands which form directly on a surface of the anatase titanium oxide and interact strongly with the support. The exact reasons for the improvements are not presently known, which contributes to the unexpected nature of the present discovery.

Exemplary embodiments of the present invention include:

(1) A catalyst comprising at least one agglomerate of crystallites comprising cerium oxide interdispersed in titanium dioxide, and at least one island comprising cerium oxide on a surface of the titanium dioxide.

(2) The catalyst of paragraph (1) above, wherein the titanium dioxide is anatase titanium dioxide.

(3) The catalyst of paragraph (1) above, wherein the at least one agglomerate of crystallites and the at least one island are in a mixture on the surface of the titanium dioxide.

(4) The catalyst of paragraph (1) above, wherein the at least one agglomerate of crystallites and the at least one island are distinct and do not overlap on the surface of the titanium dioxide.

(5) The catalyst of paragraph (1) above, wherein the titanium dioxide is in the form of at least one aggregate of anatase crystallites, wherein the anatase crystallites are from 2 to 50 nm in diameter, and the at least one aggregate is from 25 to 150 nm in diameter.

(6) The catalyst of paragraph (5) above, wherein the anatase crystallites are from 8 to 20 nm in diameter.

(7) The catalyst of paragraph (5) above, wherein the at least one aggregate of anatase crystallites is from 50 to 100 nm in diameter.

(8) The catalyst of paragraph (1) above, wherein the at least one agglomerate of crystallites comprising cerium oxide interdispersed in the titanium dioxide is colloidal cerium oxide.

(9) The catalyst of paragraph (1) above, wherein the at least one agglomerate of crystallites comprising cerium oxide interdispersed in the titanium dioxide comprises crystallites of between 3 to 15 nm in diameter.

(10) The catalyst of paragraph (1) above, wherein the at least one agglomerate of crystallites comprising cerium oxide interdispersed in the titanium dioxide comprises cerium oxide crystallites of between 5 and 10 nm in diameter.

(11) The catalyst of paragraph (1) above, wherein the at least one agglomerate of crystallites comprising cerium oxide interdispersed in the titanium dioxide comprises at least one cerium oxide polycrystalline structure.

(12) The catalyst of paragraph (1) above, wherein the at least one island comprising cerium oxide on a surface of the titanium dioxide comprises non-colloidal cerium oxide.

(13) The catalyst of paragraph (12) above, wherein the source of non-colloidal cerium oxide is a soluble Ce salt.

(14) The catalyst of paragraph (1) above, wherein the at least one island comprising cerium oxide dispersed on a surface of the titanium dioxide is less than 20 nm in diameter.

(15) The catalyst of paragraph (1) above, wherein the at least one island comprising cerium oxide dispersed on a surface of the titanium dioxide is 3 nm thick or less.

(16) The catalyst of paragraph (1) above, wherein the at least one island comprising cerium oxide dispersed on a surface of the titanium dioxide comprises a cerium oxide lattice.

(17) The catalyst of paragraph (1) above, wherein the titanium dioxide further comprises at least one component selected from the group consisting of aluminum, phosphorous, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

(18) The catalyst of paragraph (17) above, wherein the component is a promoter.

(19) The catalyst of paragraph (1) above, wherein the at least one agglomerate of crystallites further comprises at least one component selected from the group consisting of aluminum, phosphorous, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

(20) The catalyst of paragraph (1) above, wherein the at least one island further comprises at least one component selected from the group consisting of aluminum, phosphorous, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

(21) The catalyst of paragraph (1) above, wherein the catalyst is hydrothermally treated.

(22) A method of producing a catalyst, comprising adding a first portion of cerium oxide to titanium dioxide, and subsequently adding a second portion of cerium oxide to the titanium dioxide.

(23) The method of paragraph (22) above, wherein the titanium dioxide is anatase titanium dioxide.

(24) The method of paragraph (22) above, wherein the first portion of cerium oxide is colloidal cerium oxide, and the second portion of cerium oxide is a soluble source of Ce.

(25) The method of paragraph (22) above, wherein the first portion of the cerium oxide forms an agglomerate of cerium oxide crystallites interdispersed in the titanium dioxide, and the second portion of the cerium oxide forms at least one island on a surface of the titanium dioxide.

(26) The method of paragraph (25) above, wherein the at least one agglomerate of crystallites and the at least one island are in a mixture on the surface of the titanium dioxide.

(27) The method of paragraph (25) above, wherein the at least one agglomerate of crystallites and the at least one island are distinct and do not overlap on the surface of the titanium dioxide.

(28) The method of paragraph (22) above, wherein the titanium dioxide further comprises at least one component selected from the group consisting of aluminum, phosphorous, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

(29) The method of paragraph (22) above, wherein the component is a promoter.

(30) The method of paragraph (25) above, wherein the at least one agglomerate of crystallites further comprises at least one component selected from the group consisting of aluminum, phosphorous, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

(31) The method of paragraph (25) above, wherein the at least one island further comprises at least one component

(32) A process of selectively reducing NOx levels in an exhaust gas comprising contacting the exhaust gas comprising NOx with a catalyst according to paragraph (1) above, in the presence of a reducing agent.

(33) The process of paragraph (32) above, wherein the reducing agent is at least one selected from the group consisting of ammonia, urea and a hydrocarbon.

(34) A formed SCR catalyst taking the shape of a pellet, cylinder, sphere, or monolith incorporating the catalyst of paragraph (1) above.

(35) A promoted TiO2 support comprising titanium dioxide and at least one promoter selected from the group consisting of aluminum, phosphorous, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

(36) The promoted TiO2 support of paragraph (35) above, wherein the titanium dioxide is anatase titanium dioxide.

(37) The promoted TiO2 support of paragraph (35) above, further comprising cerium oxide deposited thereon.

(38) The promoted TiO2 support of paragraph (35) above, comprising at least one agglomerate of crystallites comprising cerium oxide interdispersed in the titanium dioxide, and at least one island comprising cerium oxide on a surface of the titanium dioxide.

(39) A method of forming colloidal $CeO_2$ comprising dissolving a cerium salt in water then slowly raising the pH to above 1.5 until a precipitate begins to form, then re-acidifying with nitric acid to pH 1.5.

(40) The method of paragraph (39) above, wherein the cerium salt is dissolved in water until the pH is raised above 2.

The catalyst of the present invention typically comprises cerium oxide ($CeO_2$) and anatase titanium dioxide ($TiO_2$) in a specific morphology. The morphology involves two forms of cerium oxide. The first portion interacts strongly and directly with the anatase titanium dioxide by forming small islands directly on a surface of the anatase titanium oxide. The second portion interacts less strongly and indirectly by forming a network of agglomerated, porous cerium oxide nanometer-scale crystallites in discrete domains inter-dispersed among the anatase titanium dioxide particles.

The titanium dioxide morphology is comprised of 25 to 750 nm aggregates, preferably 50 to 500 nm aggregates, with some particles optionally being in 50-200 nm aggregates, of 2 to 40 nm anatase crystallites, preferably 5 to 30 nm crystallites, with some crystallites optionally being between 8 and 20 nm. X-ray diffraction of these samples show line broadening which, according to the Scherrer Equation, indicates an average crystallite size of 20 nm with the possibility that the mean ranges are between 3 and 50 nm.

Millennium Inorganic Chemicals DT-51 is a nanocrystalline anatase derived from the sulfate process. It is available as a dry powder with average particle size of approximately 1 micron diameter. Surface area ranges from 80 to 100 $m^2$, and residual sulfate content falls between 0.8 and 1.7% when measured as $SO_3$. The performance of DT-51 in the present invention can be improved by the use of one or several types of promoters. Those which may increase thermal stability can be chosen from a group of elements including aluminum, phosphorous, lanthanum, or preferably zirconium and silicon. Silica can be added in a number of ways, but one method of deposits a unique form of silicon oxide and is of particular efficacy is described in U.S. Ser. No. 12/533,414, which is incorporated by reference into this document in its entirety. Acidity of titania may be increased by addition of niobium, strontium, boron, or preferably tungsten and molybdenum, and activity of the resulting catalyst may be modified by addition of manganese, cobalt, chromium, silver, bismuth, copper, europium, tin, zinc, praseodymium, antimony or preferably iron. The promoters can be used individually or in any combination for the reasons identified or because they offer other advantages. For example, an element such as tungsten can improve thermal stability although it may be added to titania in order to increase acidity.

An exemplary morphology of an embodiment prepared from colloidal cerium oxide, such as that available from Aldrich Chemicals at 20% solids loading in 2.5% acetic acid, or that available from NanoTek, product name CE-6042 at 18% solids with 30 nm average particle size, or product name CE-6082 from NanoTek with alkaline dispersant and 30 nm average particle size, or product name CE-6080 with alkaline dispersant and 720 nm average particle size, or product name Needrahl available from Taki Chemical Co. with 15% solids, or that sold by Alfa-Aesar at 20% solids loading dispersed in 0.2 molar nitrate with particle size ranging between 10 and 20 nm, or preferably Alfa-Aesar colloidal dispersion of 20% nm, solids dispersed in 0.4 mole/mole $CeO_2$ with 10-20 nm particles. It is also possible to form a colloidal suspension of $CeO_2$ by milling solid cerium oxide to the proper particle size in the presence of water and a dispersant. Another method of forming colloidal $CeO_2$ involves dissolving a cerium salt in water then slowly raising pH to above 1.5 and preferably above 2 where a precipitate begins to form then re-acidifying with nitric acid to pH 1.5. Materials prepared by combining colloidal cerium oxide with anatase titanium dioxide exhibit predominantly composite structures as illustrated in FIGS. 1-4. This exemplary sample composite comprises discrete rounded cerium oxide crystallites generally between 5 and 10 nm in diameter with the occasional crystal diameter falling between 3 to 15 nm. According to XRD line broadening the medium diameter of the cerium oxide crystallites is around 7.5 nm and may range from 5-10 nm in diameter. The crystallites are inter-dispersed among anatase titanium dioxide particles exhibiting limited interaction as determined by high contact angles. The particles usually bounded by the {111} or {200} surfaces and exhibit a thin amorphous layer at the surface.

It is also possible that some accumulation of individual cerium oxide crystallites may occur to form polycrystalline structures which increase in size and prevalence with increasing addition of colloidal suspension. It is possible that the interaction of the cerium oxide crystallites with anatase is at least strong enough to prevent significant sintering and particle growth of both anatase and cerium oxide crystallites.

An exemplary morphology of a non-colloidal sample, prepared by impregnation of water soluble Ce salts, such as cerium(III) chloride, cerium(III) fluoride, cerium(III) iodide, cerium (III) bromide, cerium(III) nitrate hexahydrate, ammonium cerium(IV) sulfate, cerium(III) acetate, cerium(III) oxalate, cerium(III) sulfate oxahydrate, cerium (IV) sulfate, or, preferably ammonium cerium(IV) nitrate is illustrated in FIGS. 5-10. This sample, prepared by impregnation of water soluble Ce salts, shows structures consistent with topotaxial growth of thin over-layers of cerium oxide on top of anatase crystallites. The over-layers form slabs of cerium oxide islands which are typically less than 3 nm thick although over-layer structures of >5 nm may be found. The width of islands is usually less than 10 nm in diameter but can range up to 20 nm in diameter. The islands are highly wetting indicative of a strong interaction between the over-layer and the anatase substrate. The islands show nascent crystallinity as suggested by the formation of discernable cerium oxide lattice spacing generally of 5 layers or less with some as thick as 15-20 layers. The location of the islands appears to prefer the high energy {103} anatase surface and possibly others. The orientation preferentially exposes the higher energy ceria {200} face at the top of the islands and parallel to the anatase surface. The long edges are comprised primarily of the {111} surface. Given the thin, flat geometry, the ratio of {200} to {111} exposed surfaces is higher for the islands compared to that for the sample prepared from colloidal ceria. While not wishing to be bound by theory, one may suggest that either the strong interaction between the ceria and anatase or the preferential exposure of the {200} face of the ceria, or some combination of both accounts for the improved activity of the impregnated sample compared that which was prepared with the colloidal ceria only. It is possible that the strength of interaction between cerium oxide islands and anatase is favored to the point of preventing significant formation of spherical particles greater than 3-5 nm in diameter as are evidenced in the ex-colloidal sample.

Figure 9:
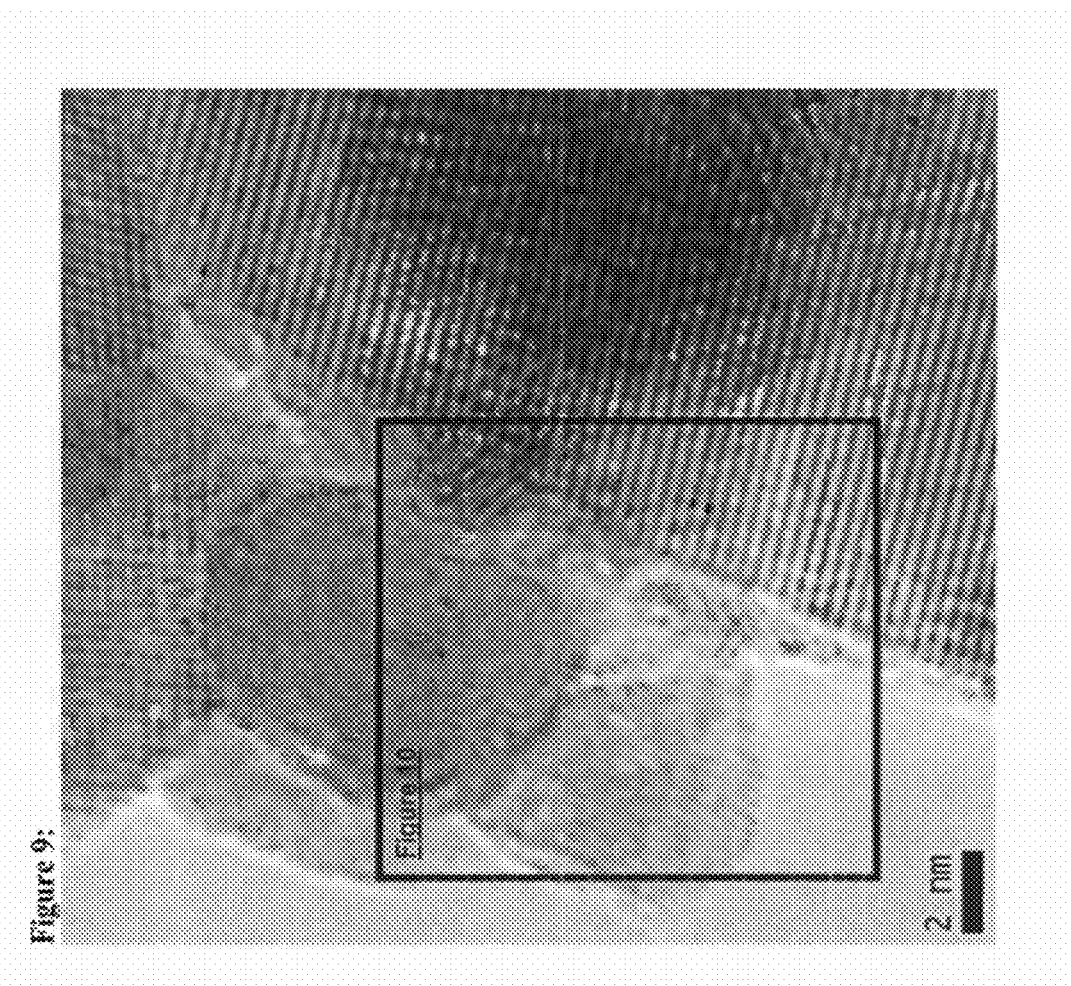
FIG. 9 is a TEM image of DT-51 treated with 3 weight % colloidal $CeO_2$ followed by impregnation of 3 weight percent of $CeO_2$ showing intimate contact between spherical ex-colloid crystallites and islands or slabs formed from impregnating soluble salts.
Figure 10:
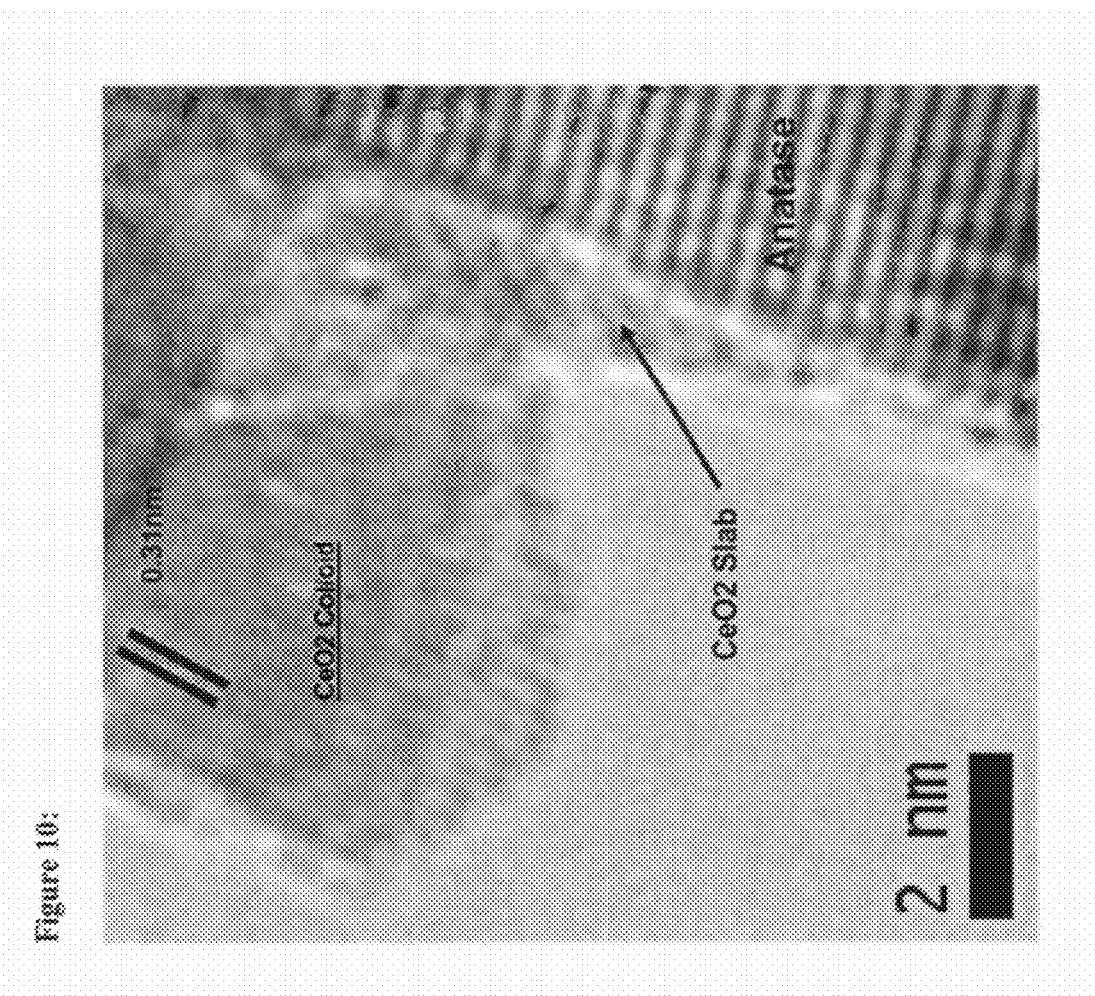
FIG. 10 is an enlarged TEM image of DT-51 treated with 3 weight % colloidal $CeO_2$ followed by impregnation of 3 weight percent of $CeO_2$ showing intimate contact between spherical ex-colloid crystallites and islands or slabs formed from impregnating soluble salts.
Figure 11:
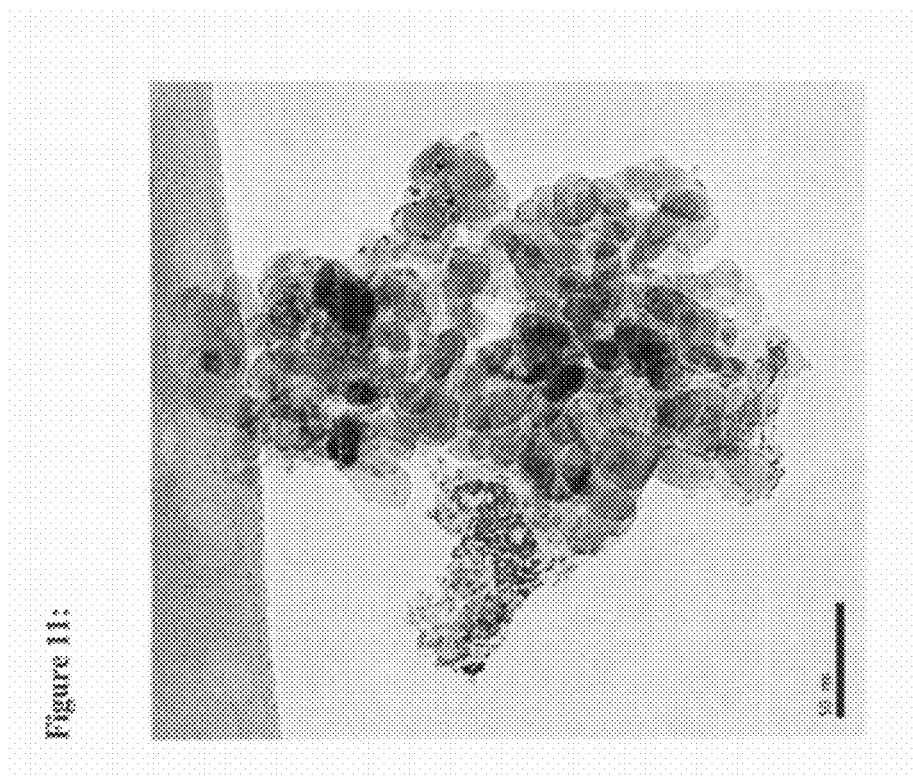
FIG. 11 is a TEM image at a low magnification showing a 50 nm agglomeration of 3-8 nm $CeO_2$ crystallites on a single anatase particle loaded with W, Si and Zr.
Figure 12:
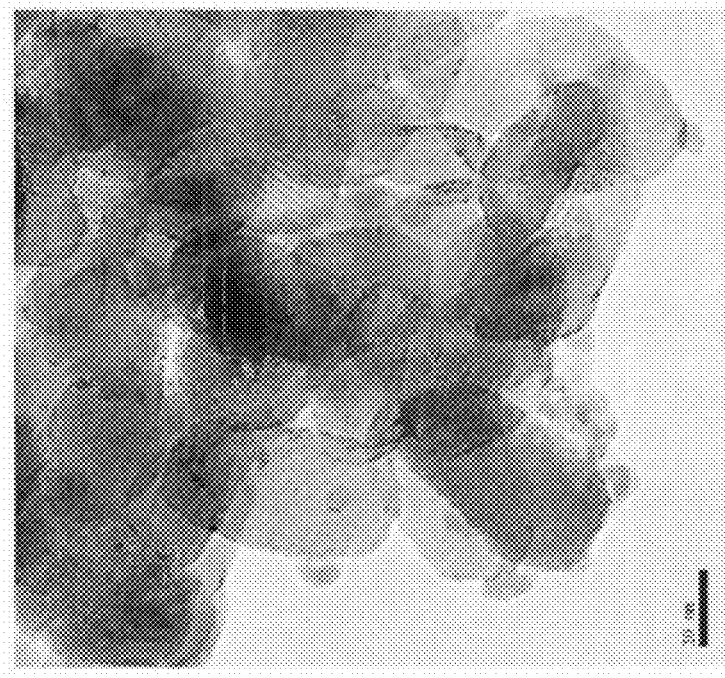
FIG. 12 is an enlarged TEM image showing 3-8 nm $CeO_2$ crystallites dispersed in anatase $TiO_2$ loaded with W, Si and Zr.

While not wishing to be bound by theory, the unexpected improvement in performance achieved by depositing colloidal cerium oxide followed by impregnating with soluble cerium salts may be characterized by the two distinct morphologies, exemplary of the individual preparation techniques, existing together in a single sample. Further, it may be possible that the two morphologies exist in intimate contact with each other as related to the method and order of deposition. Representations of combinations of morphologies are shown in the micrographs of FIGS. 11-12. These micrographs are taken from samples prepared by first treating anatase $TiO_2$ with colloidal $CeO_2$ and then impregnating with soluble cerium salts. FIGS. 9 & 10 show specifically a spherical cerium oxide crystallite, characteristic of treating with colloidal cerium oxide, directly in contact with a cerium oxide island or slab, which is representative of soluble cerium salt impregnation.

SCR in mobile sources such as light or heavy duty trucks is typically performed by first injecting a reducing agent into the exhaust gas, then passing the exhaust gas containing the reducing agent through a canister, or "can," containing a DeNOx catalyst, to result in reduction of the NOx. The canister containing the catalyst is typically directly in-line in the exhaust system of the vehicle, so that the exhaust from the engine passes directly into the canister, then following NOx reduction, the resulting exhaust passes out of the canister through the vehicles exhaust pipes. Typical reducing agents include ammonia, urea, and hydrocarbons.

The present invention further relates to a diesel engine exhaust system containing the present invention catalyst therein. The present invention catalyst can be present in the exhaust system as pressed beads, pellets, extruded cylinders or, preferably for optimal vapor-solid contact with minimal pressure drop as a honeycomb monolith. Furthermore the present invention can be formed into these various shapes by mixing with water and various binders, kneading into a paste, and pressing or extruding into the desired shape, whether pellet, sphere, cylinders or monolith. Alternatively, the present invention can be mixed with binder and sufficient water to form a fluid slurry, contacted with a shaped substrate such as a cordierite monolith such as that produced by Corning Inc. to form a thin washcoat layer. The monolith, thus produced is generally encapsulated in a cylindrical can, open at both ends for final application in the diesel exhaust system.

EXAMPLES

Description of Catalyst Evaluation Methods

Reactor Testing Procedure

The catalysts prepared according to the Examples described below are tested in two separate manners. The first involves a screening method to rapidly evaluate catalyst performance. In this test a 0.2 g sample of catalyst in the powder form is tested in a fixed bed reactor. The composition of the reactor feed is 500 ppm NO, 500 ppm $NH_3$, 10 vol. % $O_2$, 5.5 vol. % $H_2O$, and balance $N_2$. Gas hourly space velocity (GHSV) is 100 l/hr-g catalyst. NO conversion is measured at 250° C. The measurements are made by first establishing steady state while passing the effluent stream through the reactor to determine the catalyst performance, and then bypassing the reactor to determine concentration measurements in the absence of reaction. Conversion is determined by the relative difference.

The second manner of testing is done over an extended period of time at several temperatures. In this case the reactor feed composition is 1000 ppm NO, variable $NH_3$, 10 vol % $O_2$, 5 vol % $H_2O$, and balance $N_2$. Gas hourly space velocity (GHSV) is 330 l/hr-g catalyst, and catalyst performance is measured at 200, 250, 300, 400, and 500° C. Conversion is measured at increasing ammonia concentrations of 200, 400, 600, 800, and 1000 ppm for each respective temperature. The values reported represent the maximum NO conversion at each temperature.

Percent NOx conversion is calculated in the following manner:

$$\text{Conversion} = 100\% \times [1 - \{(NO+NO2)o/(NO+NO2)i\}]$$

Where:
(NO+NO2)i=The total concentration of NO and NO2 at the inlet of the reactor
(NO+NO2)o=The concentrations of NO and NO2 at the outlet of the reactor One problem with using conversion as a sole measure of performance is that only as much NO as is present can be converted, so the maximum value is 1. As 1 is approached, it takes a much greater increases in activity to make small changes in conversion. Therefore, for comparison purposes the conversion results are further represented as an activity calculated as "k*tau" in the table. The term denotes the activity constant multiplied by the reactor contact time. As persons of ordinary skill are aware, this is related to the assumption that ammonia selective catalytic reduction is first order with respect to NO and zero order with respect to ammonia. Therefore, the activity is calculated from conversion as k*tau=−ln (1−conversion) where conversion is represented as a fraction of 1. Therefore the most accurate measure of DeNOx rate is k*tau as long as tau is constant, which is true for the respective comparisons.

Hydrothermal Aging

It's important for these catalyst systems to demonstrate a long active lifetime for effective use in mobile sources for 200,000 km driving distances or longer. In order to provide realistic testing of this capability in a limited amount of time, it is common to adopt an accelerated aging protocol which subjects the catalyst to severe temperatures in the presence of water vapor of approximately 10% for several hours. Although many such protocols exist in the current state of the art, it is important to choose a set of conditions which is reasonable and consistently used for comparison purposes for the several catalysts studied. The method chosen in these studies involves a 16 hr test at 750C in which the catalyst is exposed to a flowing gas consisting of 10% water vapor in nitrogen.

Transmission Electron Microscopy (TEM)

Powders were calcined at 600° C. prior to analysis. The samples were further prepared for TEM analysis by dipping holey carbon coated Cu TEM grids directly into the powder. The grids were then viewed in the TEM at magnifications ranging from 15,000 to 400,000×. Analysis was performed using a JEOL 2000FX II TEM operated at 200 kV. During the imaging process particular attention was given to characterizing particle morphology and phase distribution. Images were collected with a Gatan MultiScan CCD camera.

Example 1

Cerium is impregnated onto the support by dissolving ammonium cerium nitrate in deionized water and combining this solution with a slurry of anatase titanium dioxide (Cristal Inorganic Chemicals trade name DT-51) in water in sufficient quantity to obtain 6 weight percent Ce relative to total solids. The water is removed by evaporation, the resulting solid is dried at 100C for 6 hrs and calcined at 600C for 6 hrs in air using a muffle furnace. This sample is referred to as "fresh". A portion of this sample is further treated hydrothermally as described above. We refer to the sample treated this way as "aged", since the treatment is intended to accelerate aging induced by long term use under actual conditions.

Example 2

Colloidal cerium oxide (20% solids in water; Alfa-Aesar Product #40125) is mixed with a slurry of DT-51 in water in sufficient quantity to obtain 6 weight percent Ce relative to total solids. The pH of the solution is adjusted to 5 using dilute ammonium hydroxide and the water is removed via evaporation. The resulting solid is further dried and calcined as described in Example 1. A portion of this sample is also aged as described in Example 1.

Example 3

Colloidal cerium oxide is mixed with a slurry of DT-51 in water in sufficient quantity to obtain 3 weight percent Ce versus total solids. Ammonium cerium nitrate is then dissolved in water and added to the slurry in sufficient quantity to obtain an additional 3 w % Ce. Water is removed by evaporation, and the resulting solid is further dried and calcined as described in Example 1. A portion of this sample is also aged as described in Example 1.

Example 4

Ammonium cerium nitrate is dissolved in water and added to a slurry of DT-51 in sufficient quantity to obtain 3 w % Ce relative to total solids. Colloidal cerium oxide is then added to this slurry to obtain an additional 3 w % Ce. Water is removed by evaporation, and the resulting solid is further dried and calcined as described in Example 1. A portion of this sample is also aged as described in Example 1.

Example 5

A support is designed to improve the activity of the catalyst, as well as its stability to the hydrothermal treatment to induce aging.

The support is prepared by first suspending DT-51 in water by mixing and further neutralizing to pH 5.5 by adding dilute ammonium hydroxide. Ammonium paratungstate is then added to the slurry to obtain a nominal 6 w % $WO_3$ loading on a solids basis. Following this step silicic acid is added according to U.S. Ser. No. 12/533,414 at a target loading of 2.5 w % $SiO_2$. This mixture is again neutralized to pH 5.5 and allowed to mix for 20 minutes. Finally, zirconium sulfate is added to the slurry in sufficient quantities to obtain 0.4 w % Zr. Again the slurry is neutralized to pH 5.5 with dilute ammonium hydroxide and filtered to remove water. The sample is dried at 100° C. for 6 hrs and calcined at 500° C. for 6 hrs.

The support is further transformed into a catalyst by first suspending the calcined powder in water with stirring and combining it with colloidal cerium oxide in sufficient quantities to obtain a loading of 12.5 w % $CeO_2$ based on total solids. Ammonium cerium nitrate is dissolved in water and added to the slurry in a quantity to increase Ce by another 3 w %. Dilute ammonium hydroxide is added to the slurry to adjust the pH to 5 and the mixture is filtered. The solid is then dried and calcined as described in Example 1. A portion of this sample is also aged as described in Example 1.

Example 6

The versatility of the preparation can be demonstrated by starting the support synthesis with the DT51 precursor gel taken from the manufacturing process prior to calcination. The titania gel of about 250 $m^2/g$ is slurried in water. Ammonium paratungstate is added to the slurry to obtain a nominal 7 w % $WO_3$ loading on a solids basis. The slurry is neutralized to pH 5.5. Following this step, silicic acid is added according to U.S. Ser. No. 12/533,414 at a target loading of 6 w % $SiO_2$. The slurry is again neutralized to pH 5.5 with dilute ammonium hydroxide and filtered to remove water. The sample is dried at 100° C. for 6 hrs and calcined at 500° C. for 6 hrs.

The support is further transformed into a catalyst by suspending the calcined powder in water with stirring and combining it with colloidal cerium oxide in sufficient quantity to obtain a loading of 10 w % $CeO_2$ based on total solids. Ammonium cerium nitrate is dissolved in water in a quantity to increase Ce by another 3 w % in addition to zirconium sulfate in an amount sufficient to deposit 0.2% Zr relative to total solids. The solution is added to the slurry and dilute ammonium hydroxide is added to the slurry to effect a co-deposition of insoluble Ce and Zr by adjusting the pH to 5. The mixture is filtered. The solid is then dried and calcined as described in Example 1. A portion of this sample is also aged as described in Example 1.

Catalyst Testing

The results of rapid screening reactor tests for catalyst materials prepared in Examples 1, 2, 3, 4, 5, and 6 are shown in Table 1 below. It is expected that combining the two methods of cerium addition, that of impregnating dissolved cerium ions and adding colloidal cerium oxide, should result in a measured rate equivalent to the mathematical average of the two samples prepared with either single method alone. This value is represented by the third entry in the table below titled "Average of Examples 1 & 2". However, the data show that combining the two methods in a single preparation by first adding colloidal cerium oxide followed by dissolved ammonium cerium nitrate results in a 60% increase in DeNOx rate compared to the mathematical average. The table also shows that if the order of addition is switched, such that the dissolved cerium nitrate is added prior to the colloidal material, a smaller improvement of 22% relative to the mathematical average is observed.

TABLE 1

Performance of catalysts in screening test after 600° C. calcination and 750° C. hydrothermal aging treatment

|  |  | 600° C. Calcination | | 750° C. HT Treatment | |
|---|---|---|---|---|---|
| Example | Screening | 250° C. NO Conversion (%) | DeNOx Rate (k * tau) | 250° C. NO Conversion (%) | DeNOx Rate (k * tau) |
| 1 | 6% $CeO_2$ Impregnated on DT-51 | 53.0 | 0.76 | 20.1 | 0.22 |
| 2 | 6% Colloidal $CeO_2$ Mixed with DT-51 | 35.9 | 0.44 | 18.0 | 0.20 |
|  | Average of Examples 1 and 2 | 45.1 | 0.60 | 19.0 | 0.21 |
| 3 | $1^{st}$ - 3% Colloidal $CeO_2$; $2^{nd}$ - 3% Impregnated $CeO_2$ on DT-51 | 61.8 | 0.96 | 22.1 | 0.25 |
| 4 | $1^{st}$ - 3% Impregnated $CeO_2$; $2^{nd}$ - 3% Colloidal $CeO_2$ on DT-51 | 51.6 | 0.73 | 23.7 | 0.27 |
| 5 | 12.5% Colloidal $CeO_2$ and 3% Impregnated $CeO_2$ on Promoted DT-51 | 82.0 | 1.71 | 60.0 | 0.92 |
| 6 | 10% Colloidal $CeO_2$ and 3% Impregnated $CeO_2$ & 0.2% $ZrO_2$ on Promoted $TiO_2$ Gel | 73.1 | 1.31 | 57.6 | 0.86 |

Unfortunately, the synergistic improvement of the two methods of cerium addition is not robust to simulated aging, and over 60% of the activity is lost from the hydrothermal treatment at 750° C. Results from Example 5 show that both activity after 600° C. calcination and 750° C. hydrothermal aging can be improved significantly with the proper support modification. Results from Example 6 show that it is not necessary to calcine titania prior to making the catalyst, which can potentially avoid an expensive preparation step.

Example 7

The catalyst of Example 3 is further analyzed with transmission electron microscopy and images are exhibited in FIGS. 9 and 10.

The unique morphology is apparent as intimate contact between spherical ex-colloid crystallites and islands or slabs formed from impregnating soluble salts in FIG. 9. FIG. 10 is an enlarged TEM image of the Example 3 catalyst showing greater detail of the intimate contact between spherical ex-colloid crystallites and islands.

Example 8

The catalyst of Example 5 is further analyzed with transmission electron microscopy and images are exhibited in FIGS. 11 and 12.

The unique morphology is apparent as two forms of $CeO_2$ are seen as structures of porous nanometer-scale crystallites in discrete domains inter-dispersed among the anatase titanium dioxide particles (as seen from lower magnification in the upper micrograph) as well as small islands which form directly on top of the anatase titanium oxide and interact strongly with the support (as seen with increased magnification displayed in the area enlargement).

Example 9

Figure 13:
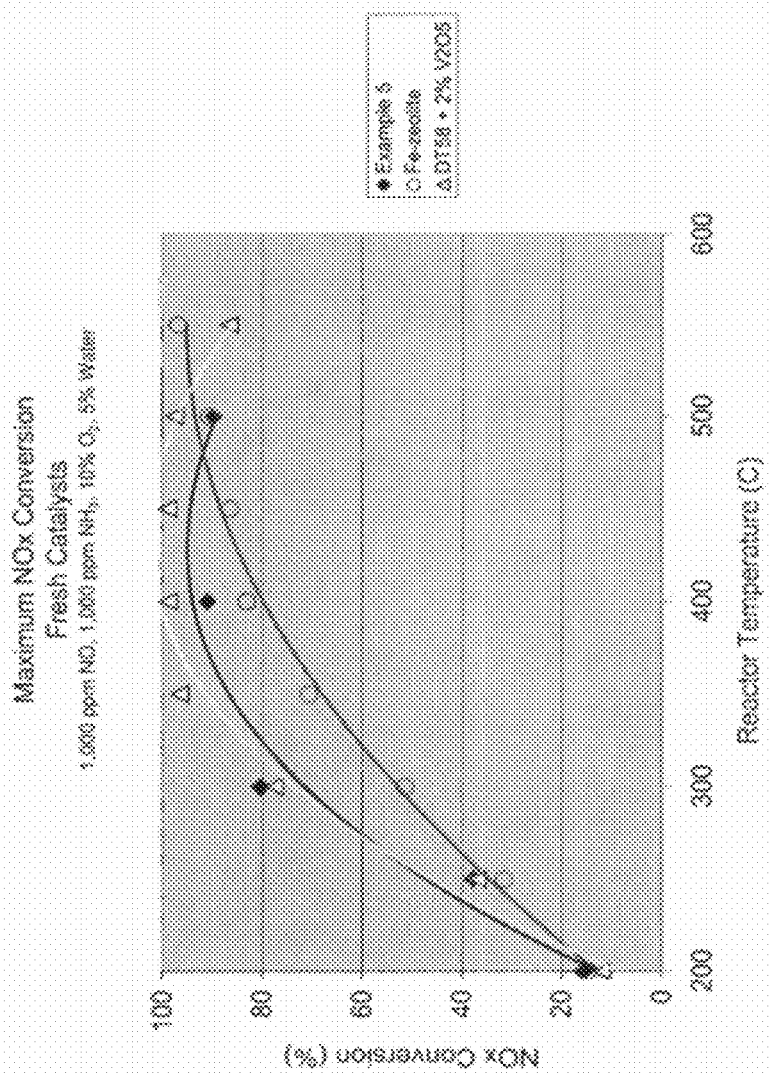
FIG. 13 is a graph showing maximum NOx conversion in extended reactor tests for freshly calcined Example 5 catalyst, 4% Fe/beta zeolite, and 2% $V_2O_5$ on DT58.

The performance of the catalyst prepared in Example 5 is evaluated in extended reactor tests and compared to commercially-equivalent materials of a nominal 4 w % iron in beta zeolite and 2 w % vanadium oxide on tungsten and silica stabilized anatase titanium oxide (Trade Name DT58 from Cristal Inorganic Chemicals). The results at maximum NOx conversion are shown in FIG. 13.

These results show that the performance of the catalyst prepared by the inventive method is comparable to a commercial grade vanadia on tungsten-titania catalysts and exceeds that of a commercial grade 4% Fe on beta zeolite.

Example 10

Figure 14:
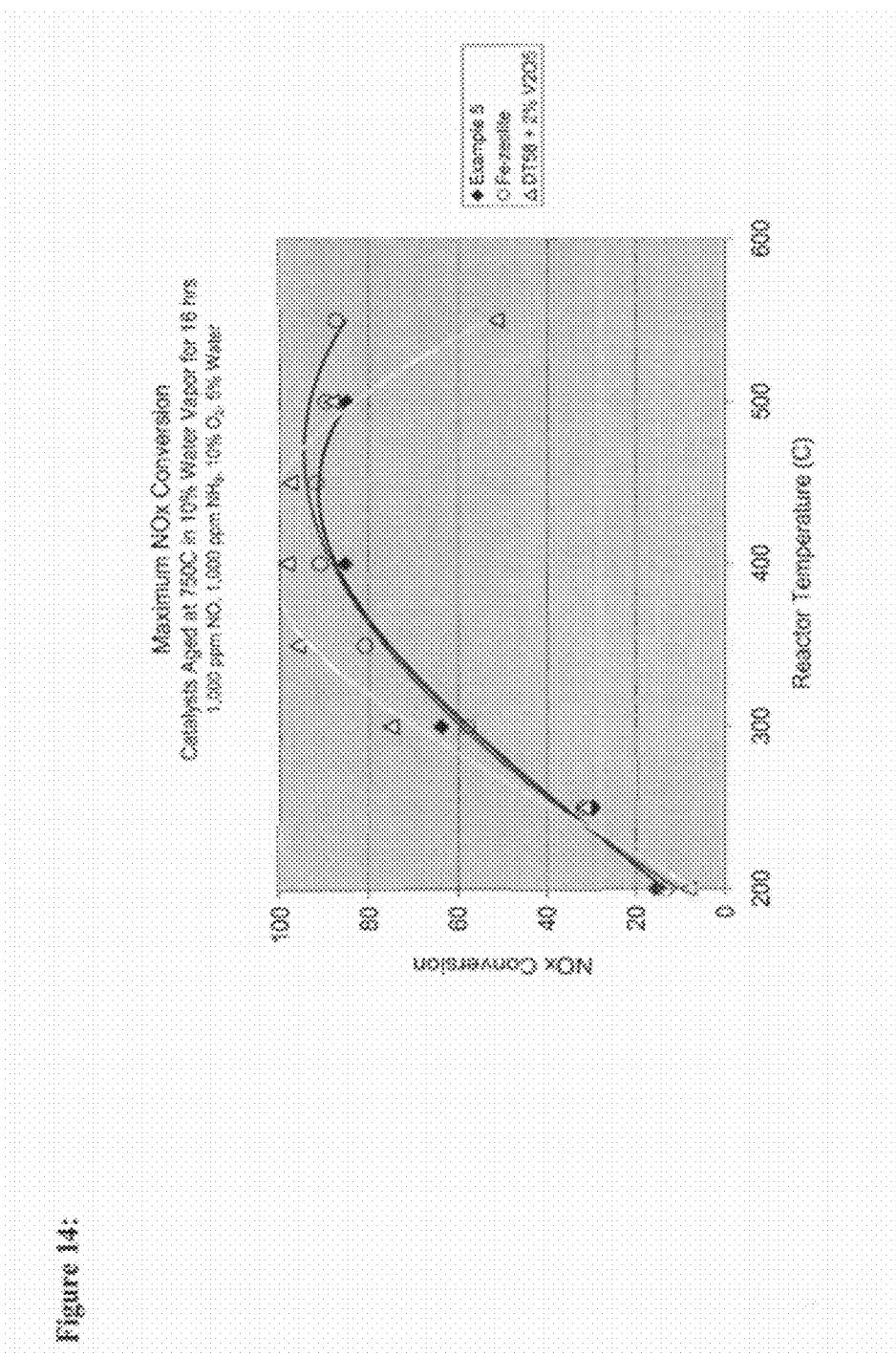
FIG. 14 is a graph showing maximum NOx conversion in extended reactor tests for aged Example 5 catalyst, 4% Fe/beta zeolite, and 2% $V_2O_5$ on DT58.

All three samples of the previous example were subjected to an aging treatment with 10% water in flowing air at 750° C. for 16 hours and tested again. The results are shown in FIG. 14. They show that after the severe treatment, the performance of the catalyst prepared in Example 5 is comparable to that of the Fe/beta zeolite sample and diminished relative to the commercial grade vanadia on tungsten-titania catalyst.

Example 11

Catalysts were prepared in a method similar to that described in Example 5 with the exception that the amount of colloidal cerium oxide was successively increased from 2.5 to 10 w %. Results from the rapid screening test show that activity after freshly calcining the catalyst as well as after the 750° C. hydrothermal treatment increase with increasing colloidal $CeO_2$ content.

TABLE 2

Effect of increasing colloidal $CeO_2$ in composition

|  | 600° C. Calcination | | 750° C. HT Treatment | |
|---|---|---|---|---|
| Example 11 Colloidal $CeO_2$ Added | 250° C. NO Conversion (%) | DeNOx Rate (k * tau) | 250° C. NO Conversion (%) | DeNOx Rate (k * tau) |
| 2.5% $CeO_2$ | 71.0 | 1.24 | 54.0 | 0.78 |
| 7.5% $CeO_2$ | 79.4 | 1.58 | 58.9 | 0.89 |
| 10% $CeO_2$ | 79.6 | 1.59 | 64.1 | 1.02 |

Example 12

A support is prepared by suspending DT-51 in water with stirring and neutralizing to pH 5.5 by adding dilute ammonium hydroxide. Ammonium paratungstate is then added to the slurry to obtain a nominal 6 w % WO$_3$ loading. Silicic acid is added according to U.S. Ser. No. 12/533,414 at a target loading of 4 w % SiO$_2$. This mixture is again neutralized to pH 5.5 and allowed to mix for 20 minutes. The sample is dried at 100° C. for 6 hrs and calcined at 500° C. for 6 hrs.

The support is further transformed into a catalyst by suspending the calcined powder in water and adding aqueous ammonium cerium nitrate in increasing quantities. Dilute ammonium hydroxide is added to the slurry to adjust the pH to 5 and the mixture is filtered. The solid is then dried at 100° C. and calcined at 600° C. and aged at 750° C. as described in Example 1.

The results of the rapid screening tests are shown in Table 3 below. It can be seen that conversion after hydrothermal aging consistently increases with cerium loading.

TABLE 3

Effect of increasing loading of deposited Ce

| | Example 12 | | 750° C. HT Treatment | |
|---|---|---|---|---|
| Ce (W %) | WO$_3$ (W %) | SiO$_2$ (W %) | 250° C. NO Conversion (%) | DeNOx Rate (k * tau) |
| 0.5 | 6 | 4 | 16.6 | 0.18 |
| 1 | 6 | 4 | 30.1 | 0.36 |
| 2 | 6 | 4 | 45.0 | 0.60 |
| 2.75 | 6 | 4 | 52.7 | 0.75 |
| 3 | 6 | 4 | 54.7 | 0.79 |
| 3 | 6 | 4 | 54.0 | 0.78 |
| 3 | 6 | 4 | 53.6 | 0.77 |
| 3.25 | 6 | 4 | 53.3 | 0.76 |

Example 13

A support is prepared as described in Example 12 with the exception that the tungsten oxide loading was varied from 1 to 9 w %. A catalyst was prepared from this support by suspending the calcined powder in water by stirring and adding aqueous ammonium cerium nitrate in sufficient quantity to yield 3 w % Ce. Dilute ammonium hydroxide is added to the slurry to adjust the pH to 5. The mixture is filtered, and the solid is dried at 100° C.

Catalyst testing using the rapid screening method reported in Table 4 below show that catalyst activity increases with increasing tungsten oxide loading to an apparent maximum around 6 w %.

TABLE 4

Effect of increasing tungsten oxide loading

| | Example 13 | | 100° C. HT Treatment | |
|---|---|---|---|---|
| Ce (W %) | WO$_3$ (W %) | SiO$_2$ (W %) | 250° C. NO Conversion (%) | DeNOx Rate (k * tau) |
| 3 | 1 | 4 | 62.9 | 0.99 |
| 3 | 5 | 4 | 79.0 | 1.56 |
| 3 | 6 | 4 | 83.4 | 1.79 |
| 3 | 6 | 4 | 83.1 | 1.78 |
| 3 | 6 | 4 | 83.1 | 1.78 |
| 3 | 7 | 4 | 77.9 | 1.51 |
| 3 | 7 | 4 | 79.6 | 1.59 |
| 3 | 7 | 4 | 76.2 | 1.43 |
| 3 | 9 | 4 | 78.1 | 1.52 |

Example 14

A support is prepared as described in Example 12 with the exception that the silicon oxide loading was varied from 0 to 6 w %. A catalyst was prepared from this support by suspending the calcined powder in water by stirring and adding aqueous ammonium cerium nitrate in sufficient quantity to yield 3 w % Ce. Dilute ammonium hydroxide is added to the slurry to adjust the pH to 5, and the mixture is filtered. The resulting is dried at 100° C., calcined at 600° C., and a portion is aged by hydrothermal treatment as described in Example 1.

Table 5 shows that adding silica to the formulation initially lowers measured catalyst conversion after freshly calcining at 600° C. However, the stability to resist deactivation from hydrothermal treatment improves.

TABLE 5

Effect of increasing silicon oxide loading

| | Example 14 | | 600° C. Calcination | | 750° C. HT Treatment | |
|---|---|---|---|---|---|---|
| Ce (W %) | WO$_3$ (W %) | SiO$_2$ (W %) | 250° C. NO Conversion (%) | DeNOx Rate (k * tau) | 250° C. NO Conversion (%) | DeNOx Rate (k * tau) |
| 3 | 6 | 0 | 64.8 | 1.04 | 42.3 | 0.55 |
| 3 | 6 | 2 | 51.8 | 0.73 | 51.1 | 0.72 |
| 3 | 6 | 4 | 55.4 | 0.81 | 54.0 | 0.78 |
| 3 | 6 | 6 | 50.5 | 0.70 | NM | NM |

Example 15

A catalyst is prepared by first adding dissolved ammonium molybdate to colloidal cerium oxide while stirring. This slurry is then combined with a slurry of DT-51. When applied, the amount of molybdenum added is sufficient to achieve a 1.1 w % MoO$_3$ loading, and cerium oxide is added to achieve a 12.5 w % composition relative to total solids present. The pH is adjusted to 4 and allowed to mix for 20 minutes. The mixture is filtered, and the resulting solid is dried at 100° C., calcined at 600° C., and a portion is aged by hydrothermal treatment as described in Example 1.

Table 6 below shows that adding molybdenum to the colloidal cerium oxide does not improve the conversion of a freshly calcined catalyst, but it does improve the conversion stability after 750° C. hydrothermal treatment of the catalyst.

TABLE 6

Effect of depositing molybdenum oxide on colloidal cerium oxide.

| Example 15 | | 600° C. Calcination | | 750° C. HT Treatment | |
|---|---|---|---|---|---|
| CeO$_2$ (w %) | MoO$_3$ (w %) | 250° C. NO Conversion (%) | DeNOx Rate (k * tau) | 250° C. NO Conversion (%) | DeNOx Rate (k * tau) |
| 12.5 | 0 | 32.6 | 0.39 | 14.6 | 0.16 |
| 12.5 | 1.1 | 32.7 | 0.40 | 25.8 | 0.30 |

Example 16

A catalyst is prepared as described in Example 15 with the exception that ammonium paratungstate was substituted for ammonia molybdate at quantities to achieve increasing WO$_3$ loadings. The table below shows that increasing the tungsten oxide loading on cerium oxide increases NOx conversion of both freshly calcined and hydrothermally aged catalysts.

TABLE 7

Effect of depositing tungsten oxide on colloidal cerium oxide

| Example 16 | | 600° C. Calcination | | 750° C. HT Treatment | |
|---|---|---|---|---|---|
| CeO$_2$ (w %) | WO$_3$ (w %) | 250° C. NO Conversion (%) | DeNOx Rate (k * tau) | 250° C. NO Conversion (%) | DeNOx Rate (k * tau) |
| 12.5 | 2 | 37.1 | 0.46 | 31.0 | 0.37 |
| 12.5 | 3 | 39.4 | 0.50 | 34.0 | 0.42 |
| 12.5 | 4 | 40.2 | 0.51 | 40.1 | 0.51 |

Comparative Example 1

A catalyst is prepared in accordance with the method disclosed by Kato et al. in U.S. Pat. No. 7,585,807 B2.

A support is prepared by first suspending DT-51 in water by mixing and further neutralizing it to pH 5.5 by adding dilute ammonium hydroxide. Ammonium paratungstate is then added to the slurry to obtain a nominal 6 w % WO$_3$ loading. Following this step, silicic acid is added to the slurry by treating sodium silicate with sufficient ion exchange resin to replace all the sodium present with hydrogen ions and adding this immediately to the slurry suspension. The target loading is 2.5 w % SiO$_2$. This mixture is again neutralized to pH 5.5 and allowed to mix for 20 minutes. Finally, zirconium sulfate is added to the slurry in sufficient quantities to obtain 0.4 w % Zr. Again the slurry is neutralized to pH 5.5 with dilute ammonium hydroxide and filtered to remove water. The sample is dried at 100° C. for 6 hrs and calcined at 500° C. for 6 hrs.

The support is further transformed into a catalyst by suspending the calcined powder in water and adding colloidal cerium oxide as taught in U.S. Pat. No. 7,585,807 B2. The solid is then dried at 100° C. and calcined at 600° C. and a portion is aged at 750° C. under hydrothermal conditions as described in Example 1.

Example 17

The support is prepared by depositing a nominal loading of 6 w % WO$_3$, 10 w % CeO$_2$, 0.4 w % Zr and 2.5 w % SiO2 on to DT51. A support is prepared by first suspending DT-51 in water by mixing and further neutralizing it to pH 5.5 by adding dilute ammonium hydroxide. Ammonium paratungstate is then added to the slurry to obtain a nominal 6 w % WO$_3$ loading. Following this step silicic acid is added according to U.S. Ser. No. 12/533,414 at a target loading of 2.5 w % SiO$_2$. This mixture is again neutralized to pH 5.5 and allowed to mix for 20 minutes. The slurry is combined with colloidal cerium oxide in sufficient quantities to obtain a loading of 10% CeO$_2$. Finally, zirconium sulfate is added to the slurry in sufficient quantities to obtain 0.4 w % Zr. Again the slurry is neutralized to pH 5.5 with dilute ammonium hydroxide and filtered to remove water. The sample is dried at 100° C. for 6 hrs and calcined at 500° C. for 6 hrs.

A catalyst was prepared from this support by suspending the calcined powder in water with stirring. A second solution is prepared by dissolving ammonium cerium nitrate in sufficient quantity to deposit an additional 3 w % Ce relative to total solids. The two solutions are combined, and then dilute ammonium hydroxide is added to the slurry to adjust the pH to 5. The mixture is filtered, and the resulting solid is dried at 100° C., calcined at 600° C., and a portion is aged by hydrothermal treatment as described in Example 1.

Example 18

A support is prepared according to the description in Example 17.

A catalyst was prepared from this support by suspending the calcined powder in water with stirring. A second solution is prepared by dissolving ammonium cerium nitrate in sufficient quantity to deposit an additional 3 w % along with varying amounts of ammonium iron(II)sulfate. The two solutions are combined, and then dilute ammonium hydroxide is added to the slurry to adjust the pH to 5. The mixture is filtered, and the resulting solid is dried at 100° C., calcined at 600° C., and a portion is aged by hydrothermal treatment as described in Example 1. Example 18a is prepared with an amount of iron(II)sulfate sufficient to achieve a loading of 0.05 w % iron. The amount of iron added in Example 18b is intended to achieve a loading of 0.2 w % Fe relative to total solids present.

Catalyst Testing

The performance of the catalysts prepared in Comparative Example 1 as well as Examples 17, 18a, and 18b are shown in Table 8 below. The table shows that the method taught by U.S. Pat. No. 7,585,807 B2, while effective in producing a catalyst active for NOx removal, the performance is deficient compared to the catalyst prepared by the present inventive method. The improvement brought by two cerium oxide morphologies rather than colloidal cerium oxide alone is on the order of 68% for a freshly calcined catalyst and 22% for a sample aged at 750° C. under hydrothermal conditions.

Table 8 further shows that small amounts of iron improve conversion of NOx, but too much iron can lead to lower conversion from hydrothermally aged samples.

TABLE 8

Relative reactor performance of catalysts prepared according to
Comparative Example 1, Example 17, Example 18a, and Example 18b

| | Composition | | | | | | 600° C. Calcination | | 750° C. HT Treatment | |
|---|---|---|---|---|---|---|---|---|---|---|
| | | | | | | | 250° C. NO | DeNOx | 250° C. NO | DeNOx |
| Example | Fe (w %) | Ce (w %) | CeO$_2$ (w %) | WO$_3$ (w %) | SiO$_2$ (w %) | Zr (w %) | Conversion (%) | Rate (k * tau) | Conversion (%) | Rate (k * tau) |
| Comparative Example 1 | 0 | 0 | 13 | 6 | 2.5 | 0.4 | 55.7 | 0.81 | 57.2 | 0.85 |
| Example 17 | 0 | 3 | 10 | 6 | 2.5 | 0.4 | 74.4 | 1.36 | 64.8 | 1.04 |
| Example 18a | 0.05 | 3 | 10 | 6 | 2.5 | 0.4 | 87.9 | 2.11 | 67.9 | 1.14 |
| Example 18b | 0.2 | 3 | 10 | 6 | 2.5 | 0.4 | 73.3 | 1.34 | 59.1 | 0.89 |

Obviously, numerous modifications and variations of the present invention are possible in light of the above teachings. It is therefore to be understood that within the scope of the appended claims, the invention may be practiced otherwise than as specifically described herein.

The invention claimed is:

1. A catalyst comprising at least one agglomerate of crystallites comprising cerium oxide interdispersed in titanium dioxide, and at least one island comprising cerium oxide on a surface of the titanium dioxide.

2. The catalyst of claim 1, wherein the titanium dioxide is anatase titanium dioxide.

3. The catalyst of claim 1, wherein the at least one agglomerate of crystallites and the at least one island are in a mixture on the surface of the titanium dioxide.

4. The catalyst of claim 1, wherein the at least one agglomerate of crystallites and the at least one island are distinct and do not overlap on the surface of the titanium dioxide.

5. The catalyst of claim 1, wherein the titanium dioxide is in the form of at least one aggregate of anatase crystallites, wherein the anatase crystallites are from 2 to 50 nm in diameter, and the at least one aggregate is from 25 to 150 nm in diameter.

6. The catalyst of claim 5, wherein the anatase crystallites are from 8 to 20 nm in diameter.

7. The catalyst of claim 5, wherein the at least one aggregate of anatase crystallites is from 50 to 100 nm in diameter.

8. The catalyst of claim 1, wherein the at least one agglomerate of crystallites comprising cerium oxide interdispersed in the titanium dioxide is colloidal cerium oxide.

9. A method of forming the catalyst of claim 8 wherein the colloidal cerium oxide is formed by a process comprising dissolving a cerium salt in water then slowly raising the pH to above 1.5 until a precipitate begins to form, then re-acidifying with nitric acid to pH 1.5.

10. The method of claim 9, wherein the cerium salt is dissolved in water until the pH is raised above 2.

11. The catalyst of claim 1, wherein the at least one agglomerate of crystallites comprising cerium oxide interdispersed in the titanium dioxide comprises crystallites of between 3 to 15 nm in diameter.

12. The catalyst of claim 1, wherein the at least one agglomerate of crystallites comprising cerium oxide interdispersed in the titanium dioxide comprises cerium oxide crystallites of between 5 and 10 nm in diameter.

13. The catalyst of claim 1, wherein the at least one agglomerate of crystallites comprising cerium oxide interdispersed in the titanium dioxide comprises at least one cerium oxide polycrystalline structure.

14. The catalyst of claim 1, wherein the at least one island comprising cerium oxide on a surface of the titanium dioxide comprises non-colloidal cerium oxide.

15. The catalyst of claim 14, wherein the source of non-colloidal cerium oxide is a soluble Ce salt.

16. The catalyst of claim 1, wherein the at least one island comprising cerium oxide dispersed on a surface of the titanium dioxide is less than 20 nm in diameter.

17. The catalyst of claim 1, wherein the at least one island comprising cerium oxide dispersed on a surface of the titanium dioxide is 3 nm thick or less.

18. The catalyst of claim 1, wherein the at least one island comprising cerium oxide dispersed on a surface of the titanium dioxide comprises a cerium oxide lattice.

19. The catalyst of claim 1, wherein the titanium dioxide further comprises at least one component selected from the group consisting aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

20. The catalyst of claim 19, wherein the component is a promoter.

21. The catalyst of claim 1, wherein the at least one agglomerate of crystallites further comprises at least one component selected from the group consisting of aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

22. The catalyst of claim 1, wherein the at least one island further comprises at least one component selected from the group consisting of aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

23. The catalyst of claim 1, wherein the catalyst is hydrothermally treated.

24. A formed SCR catalyst having a shape of a pellet, cylinder, sphere, or monolith comprising the catalyst of claim 1.

25. A promoted TiO$_2$ support comprising
titanium dioxide;
at least one agglomerate of crystallites comprising cerium oxide interdispersed in the titanium dioxide;
at least one island comprising cerium oxide on a surface of the titanium dioxide;
and at least one promoter selected from the group consisting of aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

26. The promoted $TiO_2$ support of claim 25, wherein the titanium dioxide is anatase titanium dioxide.

27. The promoted $TiO_2$ support of claim 25, further comprising cerium oxide deposited thereon.

28. A method of producing the catalyst of claim 1, comprising adding a first portion of cerium oxide to titanium dioxide, and subsequently adding a second portion of cerium oxide to the titanium dioxide.

29. The method of claim 28, wherein the titanium dioxide is anatase titanium dioxide.

30. The method of claim 28, wherein the first portion of cerium oxide is colloidal cerium oxide, and the second portion of cerium oxide is a soluble source of Ce.

31. The method of claim 28, wherein the first portion of the cerium oxide forms an agglomerate of cerium oxide crystallites interdispersed in the titanium dioxide, and the second portion of the cerium oxide forms at least one island on a surface of the titanium dioxide.

32. The method of claim 31, wherein the at least one agglomerate of crystallites and the at least one island are in a mixture on the surface of the titanium dioxide.

33. The method of claim 31, wherein the at least one agglomerate of crystallites and the at least one island are distinct and do not overlap on the surface of the titanium dioxide.

34. The method of claim 31, wherein the at least one agglomerate of crystallites further comprises at least one component selected from the group consisting of aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

35. The method of claim 31, wherein the at least one island further comprises at least one component selected from the group consisting of aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

36. The method of claim 28, wherein the titanium dioxide further comprises at least one component selected from the group consisting of aluminum, phosphorus, lanthanum, zirconium, silicon, niobium, strontium, boron, tungsten, molybdenum, manganese, cobalt, chromium, silver, bismuth, copper, europium, tin, zinc, praseodymium, antimony, iron, and oxides thereof.

37. The method of claim 28, wherein the component is a promoter.

38. A process of selectively reducing NOx levels in an exhaust gas comprising contacting the exhaust gas comprising NOx with a catalyst according to claim 1 in the presence of a reducing agent.

39. The process of claim 38, wherein the reducing agent is at least one selected from the group consisting of ammonia, urea and a hydrocarbon.

* * * * *